(12) United States Patent
Fiore

(10) Patent No.: US 11,914,069 B2
(45) Date of Patent: Feb. 27, 2024

(54) SYSTEM AND MMIC ARCHITECTURE FOR COHERENT MULTI-CHIP PHASED ARRAY MIMO APPLICATIONS

(71) Applicant: Infineon Technologies AG, Neubiberg (DE)

(72) Inventor: Vincenzo Fiore, Linz (AT)

(73) Assignee: Infineon Technologies AG, Neubiberg (DE)

( * ) Notice: Subject to any disclaimer, the term of this patent is extended or adjusted under 35 U.S.C. 154(b) by 453 days.

(21) Appl. No.: 17/128,876

(22) Filed: Dec. 21, 2020

(65) Prior Publication Data

US 2022/0196796 A1 Jun. 23, 2022

(51) Int. Cl.
*G01S 7/40* (2006.01)
*G01S 7/35* (2006.01)
*H04B 7/0413* (2017.01)

(52) U.S. Cl.
CPC ............... *G01S 7/40* (2013.01); *G01S 7/352* (2013.01); *G01S 7/4017* (2013.01); *H04B 7/0413* (2013.01)

(58) Field of Classification Search
None
See application file for complete search history.

(56) References Cited

U.S. PATENT DOCUMENTS

2020/0382170 A1* 12/2020 Lang ..................... H03M 1/12
2021/0181326 A1* 6/2021 Kurvathodil ............ H01L 23/66

\* cited by examiner

*Primary Examiner* — Whitney Moore
(74) *Attorney, Agent, or Firm* — Harrity & Harrity, LLP

(57) ABSTRACT

A radio frequency (RF) system includes a radar monolithic microwave integrated circuit (MMIC), which includes: a phase detector including a test input port, and a monitoring input port, wherein the phase detector is configured to generate an output signal that represents a phase difference between a test signal received at the test input port and a monitoring signal received at the monitoring input port; a test signal path including at least one active component, the test signal path configured to receive a local oscillator signal and provide the local oscillator signal as the test signal to the test input port during a first measurement interval; and a passive signal path configured to receive the local oscillator signal and provide the local oscillator signal to the monitoring input port as the monitoring signal during the first measurement interval.

20 Claims, 8 Drawing Sheets

SYSTEM AND MMIC ARCHITECTURE FOR COHERENT MULTI-CHIP PHASED ARRAY MIMO APPLICATIONS

BACKGROUND

Radar sensors are used in a multiplicity of applications for detecting objects, wherein the detection usually comprises measuring distances and velocities of the detected objects. In particular in the automotive sector, there is an increasing need for radar sensors that can be used inter alia in driving assistance systems (advanced driver assistance systems, ADAS) such as e.g. in adaptive cruise control (ACC, or radar cruise control) systems. Such systems can automatically adapt the velocity of an automobile so as to keep a safe distance from other automobiles traveling ahead (and also from other objects and from pedestrians). Further applications in the automotive sector are e. g. blind spot detection, lane change assist and the like. In the field of autonomous driving, radar systems having multiple radar sensors will play an important part for the control of autonomous vehicles.

A radar MMIC (sometimes referred to as single chip radar) may incorporate all core functions of the RF frontend of a radar transceiver (e.g., local oscillator, power amplifiers, low-noise amplifiers (LNA), mixers, etc.), the analog pre-processing of the intermediate frequency (IF) or base band signals (e.g., filters, amplifiers, etc.), the analog-to-digital conversion, and the digital signal processing in one single package. The RF frontend usually includes multiple reception and transmission channels, particularly in applications in which beam steering techniques, phased antenna arrays, etc. are used. In radar applications, phased antenna arrays may be employed to sense the incidence angle of incoming RF radar signals (also referred to as "Direction of Arrival", DOA).

In the context of radar MMICs, so-called "cascaded systems" have emerged, whereby multiple MMICs are interconnected to embody a single overall system with increased resolution for radar targets discrimination. In a Multiple-Input Multiple-Output (MIMO) system, a local oscillator source distributes an RF signal to the transmission and reception channels of each radar MMIC. For several applications, the phase relationship between channels, both from an inter-chip and intra-chip perspective, is important. A phase difference (balance) can be tolerated and calibrated out with proper hardware and/or software under the assumption that the phase difference stays stable across operating conditions. This parameter is called phase drift and ensuring low phase drift is technically challenging, especially for RF frequencies close to the transition frequency of active components (e.g. those components comprising transistors) within the MMICs.

Therefore, an improved device and system capable of maintaining a channel-to-channel phase balance in a MIMO system may be desirable.

SUMMARY

Embodiments provide a radio frequency (RF) system that includes a radar monolithic microwave integrated circuit (MMIC), which includes: a phase detector including a test input port, and a monitoring input port, wherein the phase detector is configured to generate an output signal that represents a phase difference between a test signal received at the test input port and a monitoring signal received at the monitoring input port; a test signal path including at least one active component, the test signal path configured to receive a local oscillator signal and provide the local oscillator signal as the test signal to the test input port during a first measurement interval; and a passive signal path configured to receive the local oscillator signal and provide the local oscillator signal to the monitoring input port as the monitoring signal during the first measurement interval.

Embodiments further provide a method of monitoring RF signals in an RF circuit. The method includes generating an output signal that represents a phase difference between a test signal received at a test input port of a phase detector and a monitoring signal received at a monitoring input port of the phase detector; receiving a local oscillator signal at a test signa path a test signal path comprising at least one active component and providing the local oscillator signal as the test signal to the test input port during a first measurement interval via the test signal path; and receiving the local oscillator signal at a passive signal path, and providing the local oscillator signal to the monitoring input port as the monitoring signal during the first measurement interval via the passive signal path.

Embodiments further provide an RF system comprising a plurality of radar MMICs, each radar MMIC comprising: a phase detector comprising a test input port, a monitoring input port, and an output port, where in the phase detector is configured to generate an output signal at the output port that represents a phase difference between a test signal received at the test input port and a monitoring signal received at the monitoring input port; a test signal path comprising at least one active component, the test signal path configured to receive a local oscillator signal and provide the local oscillator signal as the test signal to the test input port during a first measurement interval; and a passive signal path configured to receive the local oscillator signal and provide the local oscillator signal to the monitoring input port as the monitoring signal during the first measurement interval; and a controller configured to adjust a phase of at least one RF channel of the plurality of radar MMICs based on each output signal generated by each of the plurality of radar MMICs.

BRIEF DESCRIPTION OF THE DRAWINGS

Embodiments are described herein making reference to the appended drawings.

DETAILED DESCRIPTION

Figure 1:
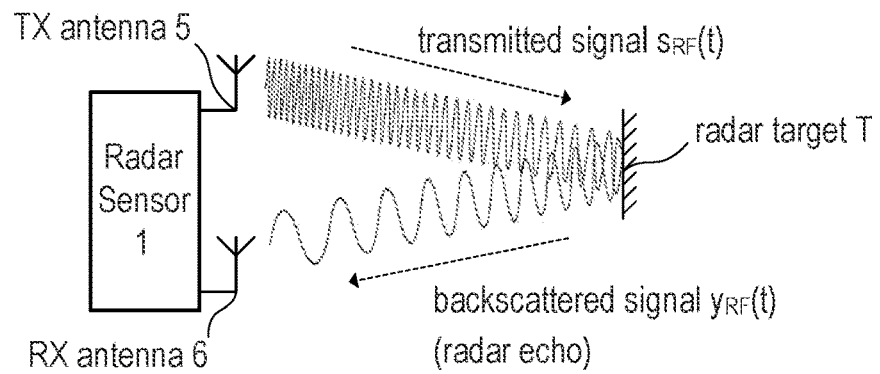
FIG. 1 is an outline to illustrate the operating principle of an FMCW radar system for distance and/or velocity measurement according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Each of the elements of the present disclosure may be configured by implementing dedicated hardware or a software program on a memory controlling a processor to perform the functions of any of the components or combinations thereof. Any of the components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (A SIC s), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

Embodiments are discussed below in the context of a radar system. It should be noted, however, that the described embodiments may also be applied in applications different from radar such as, for example, RF transceivers of RF communication devices.

FIG. 1 illustrates a frequency-modulated continuous-wave (FMCW) radar system according to one or more embodiments. The radar apparatus 1 has separate transmitting (TX) and receiving (RX) antennas 5 and 6, referred to as a bistatic or pseudo-monostatic radar configuration. It should be noted, however, that a single antenna can also be used, which serves as transmitting antenna and as receiving antenna simultaneously (monostatic radar configuration). It will be appreciated that "(t)" denotes an analog signal defined as a continuous wave that may change over a time period t, and "(k)" denotes a digital signal defined as a discrete wave, where k is an integer and may represent a kth digital sample or a digital signal containing k digital samples. A signal may be represented with or without its analog or digital domain identifier (t) and (k), respectively.

The transmission antenna 5 continuously radiates an RF signal SRF(t), which is frequency-modulated, for example, by a periodic linear frequency ramp signal (also referred to as frequency sweep or chirp signal). For example, the continuous RF signal SRF(t) may frequency-modulated with a type of sawtooth signal. The transmitted signal SRF(t) is back-scattered at a target T, which is located in the radar channel within the measurement range of the radar device. The back-scattered signal yRF(t) is a reflected signal (echo signal) and is received by the reception antenna 6. In the depicted example, the back-scattered signal is denoted as yRF(t).

It is noted that FIG. 1 shows a simplified example. In practice, radar sensors are systems having multiple transmission (TX) and reception (RX) channels, so as also to be able to determine the angle of incidence (Direction of Arrival, DoA) of the backscattered/reflected signal $y_{RF}(t)$ and hence more accurately locate the radar target T.

Figure 2:
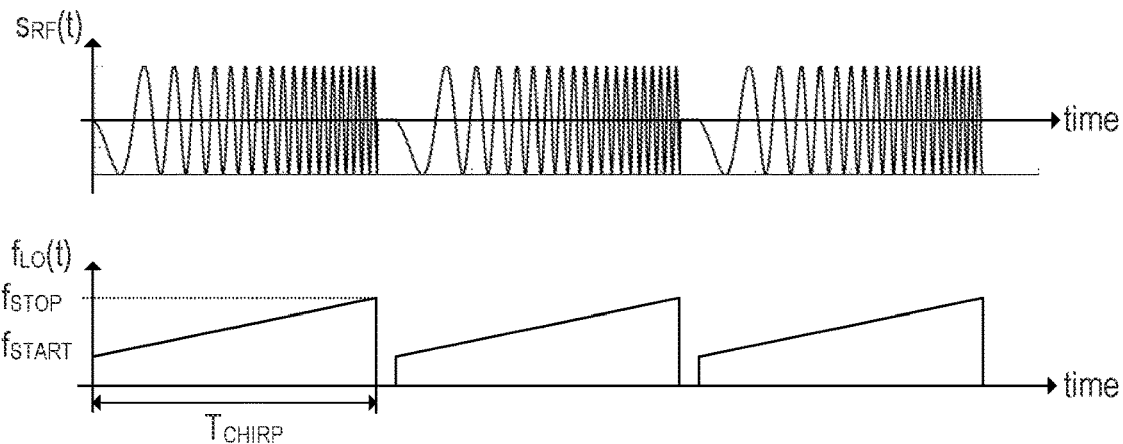
FIG. 2 comprises two timing diagrams to illustrate the frequency modulation (FM) of an RF signal generated by a frequency-modulated continuous-wave (FMCW) system according to one or more embodiments.

FIG. 2 illustrates the mentioned frequency-modulation of the signal SRF(t) according to one or more embodiments. As shown in FIG. 2, the signal SRF(t) may be composed of a series of "chirps", that is to say the signal SRF(t) comprises a sequence of sinusoidal signal profiles (waveforms) with rising frequency (up-chirp) or falling frequency (down-chirp). In the present example, the instantaneous frequency f(t) of a chirp increases linearly, starting at a start frequency fSTART to a stop frequency fSTOP within a time interval TRAMP. Such chirps are also referred to as linear frequency ramps. A plurality of ramps may make up a radar frame which may also be referred to as a radar operation cycle. For examples, a radar operation cycle may include several hundreds of radar ramps (sweeps) taking up to 10-30 ms in total. A frame length of the radar frame corresponds to one radar operation cycle. It is also to be noted that consecutive ramps have a short pause therebetween and a longer pause may be used between consecutive radar frames.

It will be appreciated that the start frequency fSTART and stop frequency fSTOP of the ramps may be within a frequency band with minimum frequency Fmin and maximum frequency Fmax. As such, frequency Fmin and frequency Fmax define an operating frequency range or the frequency band usable for the ramping signals, and, thus, the frequency range or the frequency band of the radar application of the radar MMIC. In some embodiments, the frequency range defined by a single ramp having start and stop frequencies fSTART and fSTOP may be smaller than the usable frequency band. However, all ramps that are generated during operation lie between the frequencies Fmin and Fmax of the radar band used for generating the ramping signals.

FIG. 2 illustrates three identical linear frequency ramps. It is noted, however, that the parameters fSTART, fSTOP, TRAMP as well as the pause between the individual frequency ramps may vary dependent on the actual implementation and use of the radar device 1. In practice, the frequency variation may be, for example, linear (linear ramp, frequency ramp), exponential (exponential ramp), or hyperbolic (hyperbolic ramp). In some embodiments, the frequency may decrease instead of increase during time TRAMP. Furthermore, in other embodiments the center frequency of each ramp (and therefore fSTART and fSTOP) may vary (e.g. from ramp to ramp or after detecting an interference) to allow using the full or a part of the frequency band. In one example, the frequency band has a minimum frequency Fmin of 76 GHz and a maximum frequency Fmax of 81 GHz. Other parameters, such as, the phase can also be individually set for each chirp.

For a measurement, a sequence of frequency ramps is transmitted, and the resulting echo signal is evaluated in the baseband or in the intermediate-frequency band in order to detect one or more radar targets.

Figure 3:
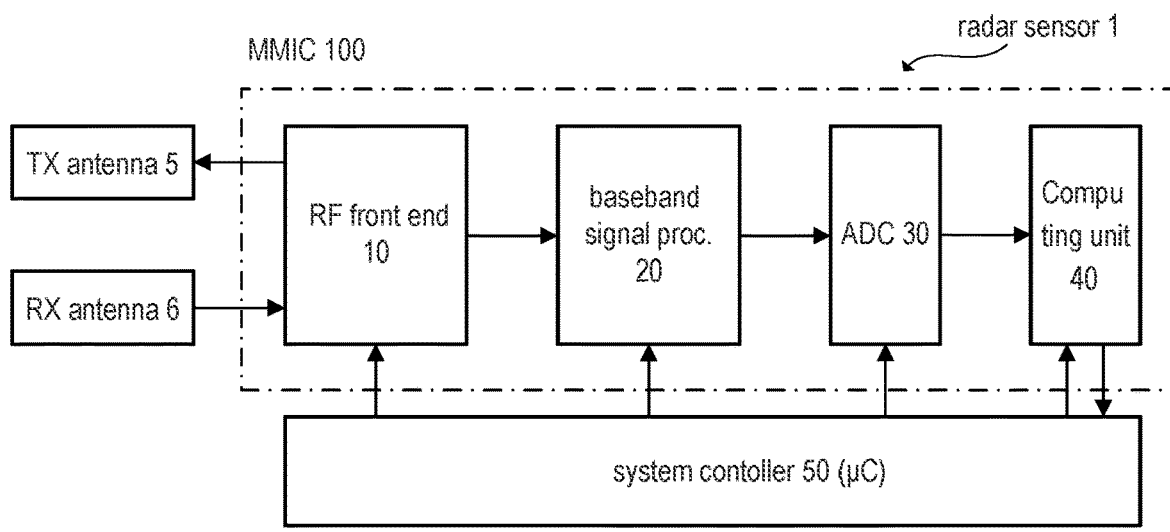
FIG. 3 is a block diagram to illustrate a basic structure of an FMCW radar system according to one or more embodiments.

FIG. 3 is a block diagram depicting a possible structure of a radar apparatus 1 (radar sensor) in exemplary fashion according to one or more embodiments. Accordingly, at least one transmitting antenna 5 (TX antenna) and at least one receiving antenna 6 (RX antenna) are connected to an RF front end 10, integrated in a chip, that can contain all circuit components that are needed for the RF signal processing. These circuit components comprise, for example, a local oscillator (LO), RF power amplifiers, low-noise amplifiers (LNA), directional couplers (e.g. rat-race couplers, circulators, etc.), and mixers for down-conversion of the RF signals (e.g., the received signal yRF(t), see FIG. 1) into the baseband or an intermediate frequency (IF) band. The RF front end 10 can be integrated—if necessary, together with further circuit components—in a chip, which is usually referred to as a monolithically microwave integrated circuit (MMIC). Accordingly, elements 10, 20, 30, and 40 are shown to be integrated in MMIC 100.

It is noted that baseband is sometimes also referred to as intermediate frequency (IF) band depending on the implementation. No further distinction is drawn below between baseband and IF band, and only the term baseband is used. Baseband signals are those signals on the basis of which the detection of radar targets is performed.

The depicted example shows a bistatic (or pseudo-monostatic) radar system having separate RX and TX antennas. In the case of a monostatic radar system, the same antenna would be used both to transmit and to receive the electromagnetic (radar) signals. In this case, for example a directional coupler (e.g. a circulator) can be used to separate the RF signals to be transmitted from the received RF signals (radar echo signals). As mentioned, radar systems in practice usually have multiple transmission and reception channels having multiple transmitting and receiving antennas (antenna arrays), which allows, among other things, measurement of the direction (DoA) from which the radar echoes are received. In such Multiple-Input Multiple-Output (MIMO) systems, the individual TX channels and RX channels are usually each of the same or a similar design and can be distributed over multiple integrated circuits (MMICs).

In the case of an FMCW radar system, the RF signals transmitted via the TX antenna 5 can be e.g. in the range from approximately 20 GHz to 100 GHz (e.g. in the range from approximately 76-81 GHz in a good many applications). As mentioned, the RF signal received by the RX antenna 6 contains the radar echoes (chirp echo signals), i.e., those signal components that are scattered back from one or more radar targets.

The received RF signal yRF(t) is down-converted to baseband and processed further in baseband by means of analog signal processing (see FIG. 3, analog baseband signal processing chain 20). Said analog signal processing substantially comprises a filtering and, if necessary, an amplification of the baseband signal. The baseband signal is finally digitized (see FIG. 3, analog-to-digital converter 30) and processed further in the digital domain by a signal processor (e.g., a computing unit 40). For this reason, the baseband signal processing chain 20, in general, may also be referred to as an analog signal processing chain 20 that is followed by a digital signal processing chain. The digital signal processing chain can be realized at least partly as software, which can be executed on a processor (see FIG. 3, computing unit 40), for example a microcontroller or a digital signal processor.

The overall system is controlled by means of a system controller 50, which can likewise be implemented at least partly as software that is executed on a processor such as, e.g., a microcontroller. The RF front end 10 and the analog baseband signal processing chain 20 and also the analog-to-digital converter 30 and optionally also the computing unit 40 (or parts thereof) can be integrated together in a single MMIC (i.e. on an RF semiconductor chip). Alternatively, the individual components can also be distributed over multiple MMICs. The computing unit 40 or parts thereof can be contained in the system controller 50.

In the examples described here, "computing unit" means any structure or group of functional entities that are designed to perform the necessary functions (calculations). A computing unit can comprise one or more processors designed to execute software/firmware instructions. The computing unit can (additionally or alternatively) also have hardwired hardware units, however, that are designed especially to quickly perform specific calculations (e.g. a constant false alarm rate (CFAR) algorithm or a fast Fourier transformation (FFT), etc.). The computing unit is not necessarily integrated in one chip but rather can also be distributed over multiple chips.

The system controller 50 can be integrated in a separate chip and designed to communicate with the MMIC 100 (or multiple MMICs) via one or more communication connections. Suitable communication connections are, for example, a serial peripheral interface (SPI) bus or low-voltage differential signaling (LVDS) in accordance with the TIA/EIA-644 standard. Parts of the aforementioned computing unit can be integrated in the system controller 50. The computing unit or parts thereof can also be integrated in the radar MMIC 100.

Figure 4:
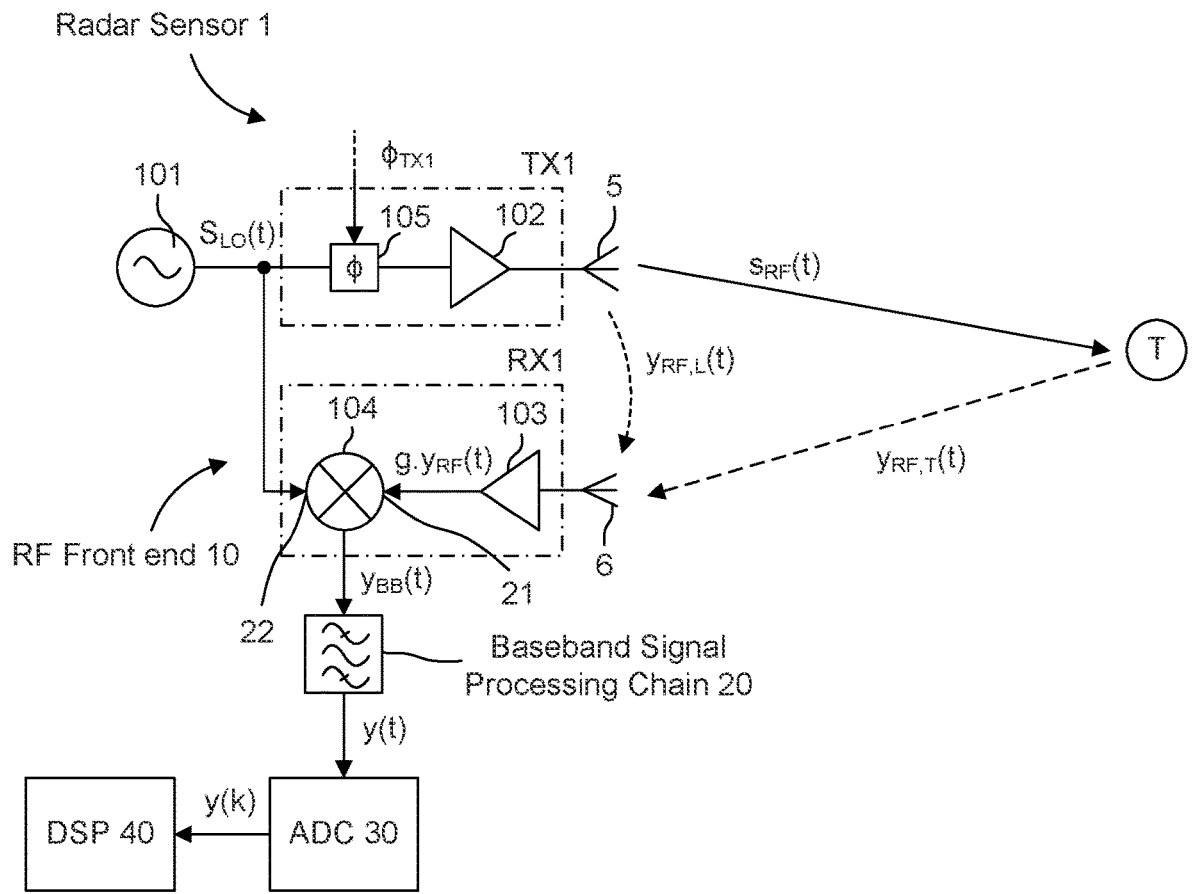
FIG. 4 is a circuit diagram to illustrate a simplified example of a radar transceiver, in particular of the RF front end of a radar transceiver, according to one or more embodiments.
Figure 5:
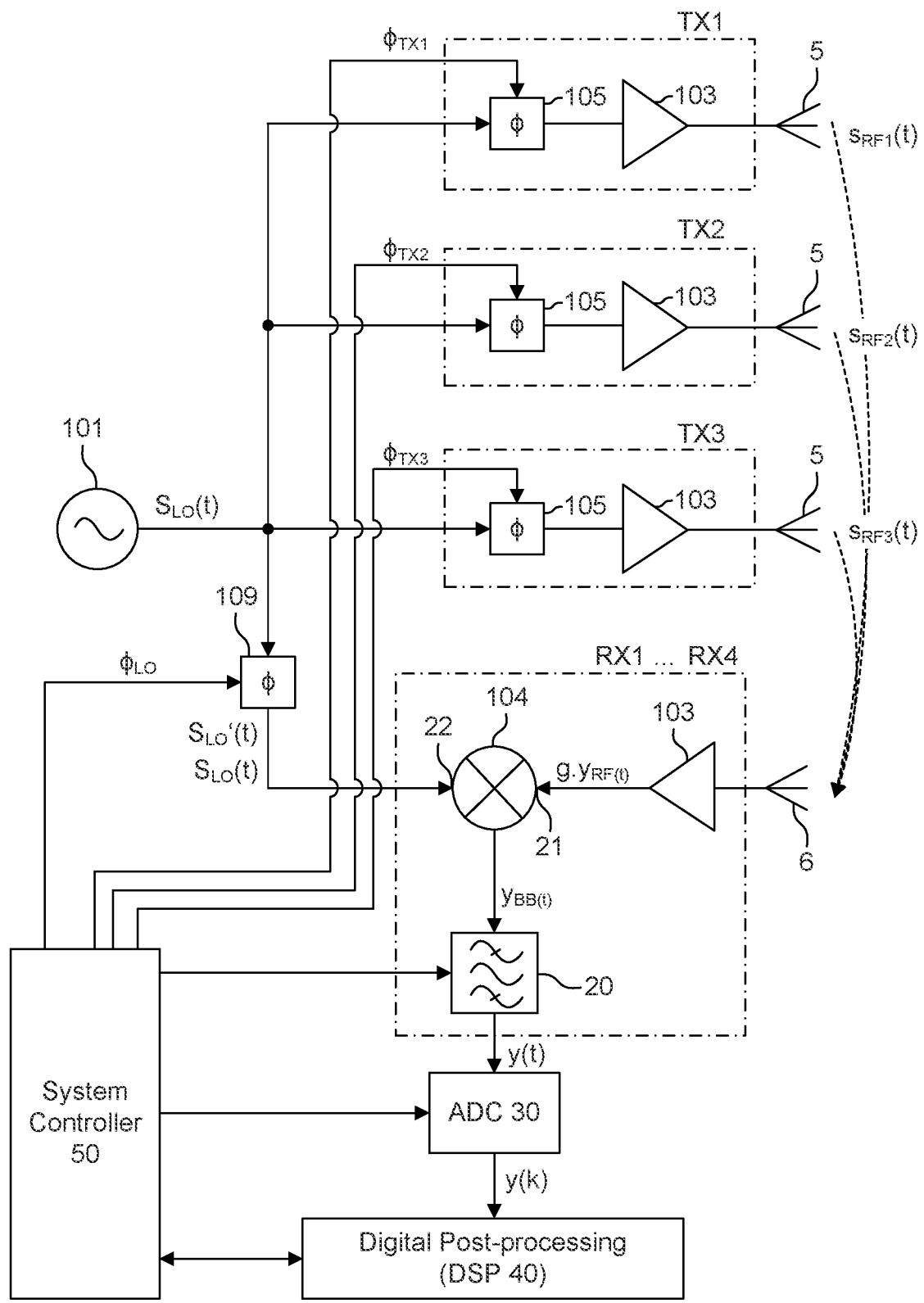
FIG. 5 illustrates an example of a radar transceiver having multiple TX channels and multiple RX channels according to one or more embodiments.

FIG. 4 illustrates an exemplary implementation of a radar transceiver 1 in accordance with the example from FIG. 3 in more detail. In the present example, in particular the RF front end 10 of the radar transceiver 1 is depicted. It should be noted that FIG. 5 depicts a simplified circuit diagram in order to show the basic structure of the RF front end 10 with a transmission channel (TX channel TX1) and a reception channel (RX channel RX1). As mentioned, actual implementations, which can be highly dependent on the specific application, are usually more complex and have multiple TX and/or RX channels, which can also be integrated in different MMICs. Thus, the notation TXi is to indicate the ith TX channel out of N TX channels, where N is any integer. Similarly, the notation RXj is to indicate the jth RX channel out of M RX channels, where M is any integer.

The RF front end 10 comprises a local oscillator 101 (LO) that generates an RF oscillator signal $S_{LO}(t)$. The RF oscillator signal $S_{LO}(t)$ is frequency-modulated during operation—as described above with reference to FIG. 2—and is also referred to as LO signal or a reference signal. In radar applications, the LO signal is usually in the super high frequency (SHF) or extremely high frequency (EHF) band, e.g., in the range from 76 GHz to 81 GHz in a good many automotive applications. A fair number of radar systems operate in the 24 GHz industrial, scientific and medical (ISM) band as well. The LO signal may also be generated at a lower frequency and then up-converted using frequency multiplication units.

While the local oscillator 101 may be provided on chip, the local oscillator 101 may also be provided external thereto. For example, the LO signal may be provided by an external local oscillator and the LO signal may be provided to MMIC 100 by another MMIC in a master/slave relationship. In particular, MMIC 100 may be part of a MIMO radar system comprising a plurality of coupled (cascaded) MMICs in which one of the MMIC is configured as a master MMIC and the remaining MMIC are configured as slave MMICs. Each of the MMICs may include a local oscillator (LO) that generates an RF oscillator signal $S_{LO}(t)$. However, for the operation of the MIMO radar system, it is beneficial for LO signals used by the MMICs to be coherent. Therefore, the LO signal is generated in one MMIC—the master MMIC—and a representation of the LO signal is distributed to the slave MMICs. The representation may for example be identical to the LO signal or the representation may be a frequency-divided signal which is then reconstructed at each MMIC by frequency multiplication. While in the following, a distribution of the LO signal will be described, it is to be understood that the following may also be applied to a frequency-divided distribution of the LO signal. In some embodiments, the master MMIC could also use the LO signal to feed itself via a signal loop to ensure the LO signal is equally delayed between the master and the slave MMICs.

The LO signal $S_{LO}(t)$ is processed both in the transmission signal path TX1 (in the TX channel) and in the received signal path RX1 (in the RX channel). The transmission signal SRF(t) (i.e., the outgoing radar signal) transmitted by the TX antenna 5 is generated by amplifying the LO signal $S_{LO}(t)$, for example, by means of the RF power amplifier 102, and is therefore merely an amplified and possibly phase-shifted version (see phase shifter 105) of the LO signal $S_{LO}(t)$. The output of the amplifier 102 can be coupled to the TX antenna 5 (in the case of a bistatic/pseudo-monostatic radar configuration). The received signal $y_{RF}(t)$ received by the RX antenna 6 is supplied to the receiver circuit in the RX channel and hence directly or indirectly to the RF port 21 of the mixer 104. In the present example, the RF received signal $y_{RF}(t)$ (antenna signal) is pre-amplified by means of the amplifier 103 with gain g. The mixer 104 thus receives the amplified RF received signal $g \cdot y_{RF}(t)$. The amplifier 103 can be, for example, a low-noise amplifier (LNA).

The reference port 22 of the mixer 104 is supplied with the LO signal $s_{LO}(t)$, so that the mixer 104 down-converts the (pre-amplified) RF received signal $y_{RF}(t)$ to the baseband (or the IF band). The down-converted baseband signal (mixer output signal) is denoted by $y_{BB}(t)$. This baseband signal $y_{BB}(t)$ is processed further in analog fashion by the analog baseband signal processing chain 20, substantially causing an amplification and a filtering (e.g. bandpass or high-pass filtering) in order to, for example, reject undesirable sidebands and image frequencies. The resulting analog output signal is denoted by y(t) and is supplied to an analog-to-digital converter (see FIG. 3, ADC 30). The ADC 30 converts the analog output signal y(t) into a digital output signal y[k] that undergoes further digital post-processing via a signal processor (e.g., DSP 40). Methods for further digital processing of the digitized output signal (digital radar signal y[k]) are known per se (e.g., Range Doppler Analysis) and are therefore not discussed in more detail herein.

In the present example, the mixer 104 down-converts the pre-amplified RF received signal g-yRF(t) (i.e. the amplified antenna signal) to baseband. The conversion can take place in one stage (that is to say from the RF band directly to baseband) or via one or more intermediate stages (that is to say from the RF band to an intermediate-frequency band and on to baseband). In this case, the receiving mixer 104 effectively comprises multiple series-connected individual mixer stages. In addition, the mixer stage can contain an IQ mixer that generates two baseband signals (in-phase and quadrature signals) that can be interpreted as a real part and an imaginary part of a complex baseband signal.

As depicted in FIG. 4, the receiving antenna 6 of the reception channel RX1 receives a superimposition comprising the signal $y_{RF,T}(t)$ reflected from the target T and a direct crosstalk from the transmitting antenna 5, which is also referred to as leakage signal $y_{RF,L}(t)$. Reflections from an object situated right in front of the antennas (sometimes also called "blockers") are also referred to as crosstalk here and contribute in equal measure to the leakage signal. Both signals $y_{RF,T}(t)$ and $y_{RF,L}(t)$ are substantially delayed and attenuated versions of the output signal $s_{RF}(t)$ of the transmission channel TX1. The time delay between the output signal $s_{RF}(t)$ of the transmission channel TX1 and the received leakage signal $y_{RF,L}(t)$ (crosstalk) is relatively short (in comparison with the time delay of the echo signal $y_{RF,T}(t)$ from the target). In the normal radar mode, the leakage signal $y_{RF,L}(t)$ therefore causes a correspondingly low-frequency component in the baseband signal $y_{BB}(t)$, and this low-frequency component of the baseband signal $y_{BB}(t)$ is rejected in the baseband signal processing chain 20. For this purpose, the baseband signal processing chain 20 can have a bandpass filter or a high-pass filter having a suitable cut-off frequency.

FIG. 5 illustrates an example of a radar transceiver having a multiplicity of TX channels and RX channels, three TX channels TX1, TX2 and TX3 and one RX channel RX1 being depicted by way of example. The RX channel RX1 represents a multiplicity of RX channels RX1, RX2, RX3, etc., by way of example, which may all be of the same type of design. The TX channels TX1, TX2 and TX3 are of substantially the same design as in the example from FIG. 4 and reference is made to the above description to avoid repetition. The same applies for the RX channel RX1. The settings of the phases ΦTX1, ΦTX2 and ΦTX3 of the phase shifters 105 in the transmission channels TX1, TX2, and TX3 can be performed by the system controller 50. The system controller 50 may adjust the settings of the phases ΦTX1, ΦTX2, and ΦTX3 of the phase shifters 105 based on a monitoring of the transmission channels, and more particularly based on the phases of the transmit signals, and based on a digital post-processing analysis performed by the DSP 40. For example, the DPS 40 and/or the system controller 50 is configured to detect a possible maladjustment of the TX channel phases ΦTX1, ΦTX2, and ΦTX3. In the event that the measured phases ΦTX1, ΦTX2, and ΦTX3 deviate from a desired setting, compensated phase information may be generated by the DPS 40 and/or the system controller 50 and provided to the phase shifters 105 in order to compensate for the deviation by adding additional phase shifts $\Delta\varphi TX01$, $\Delta\varphi_{TX02}$, and $\Delta\varphi_{TX03}$ (see also, Phaseshift_TX in FIG. 8).

The system from FIG. 5 can also have a further LO phase shifter 109, which is designed to shift the phase of the LO signal $S_{LO}(t)$ before the latter is supplied to the RX channel RX1 during a radar operation (i.e., outside a TX/RX monitoring operation). That is to say, that the phase shifter 109 is connected between the local oscillator 101 and the reception channel RX1. The phase-shifted LO signal supplied to the RX channels is denoted by $S_{LO}'(t)$. The phase shifter 109, which is designed to delay the LO signal $S_{LO}(t)$ by a phase offset $\Phi_{LO}$, is optional and may not be present. If present, the phase shifter 109 typically is not enabled during an RX monitoring operation. Thus, during RX monitoring of a reception channel, the phase shifter 109 performs no function and the LO signal $S_{LO}(t)$ simply passes therethrough without a phase shift. In other words, during RX monitoring of a reception channel, the mixer 104 receives the LO signal $S_{LO}(t)$ at one of its reference port 22. During RX monitoring, $S_{LO}'(t)$ is equated to $S_{LO}(t)$—therefore, both are indicated on signal path 18 and one may be present depending on the mode of operation (i.e., radar operation or monitoring operation).

Figure 6:
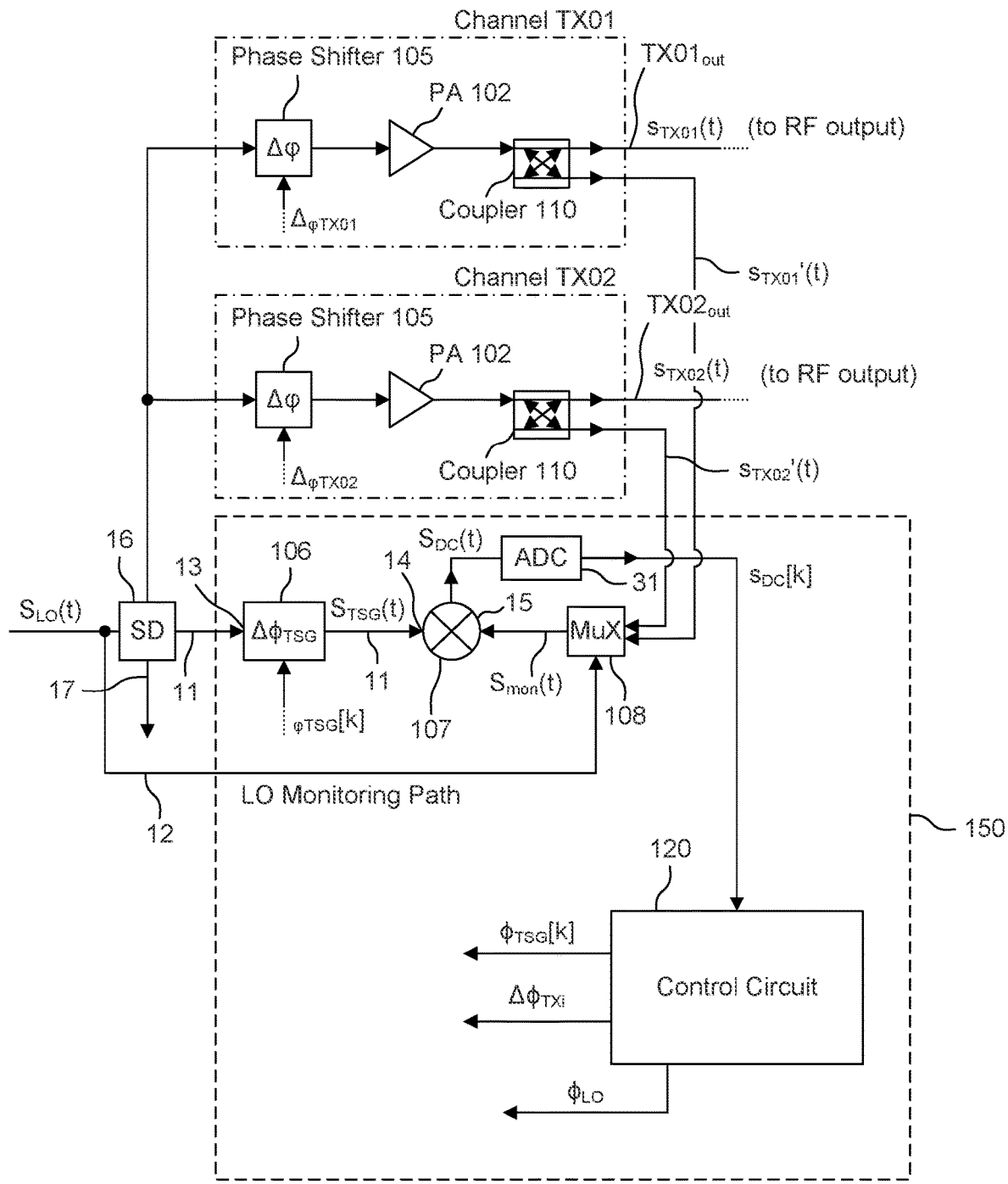
FIG. 6 is a block diagram illustrating one example of an MMIC according to one or more embodiments.
Figure 7:
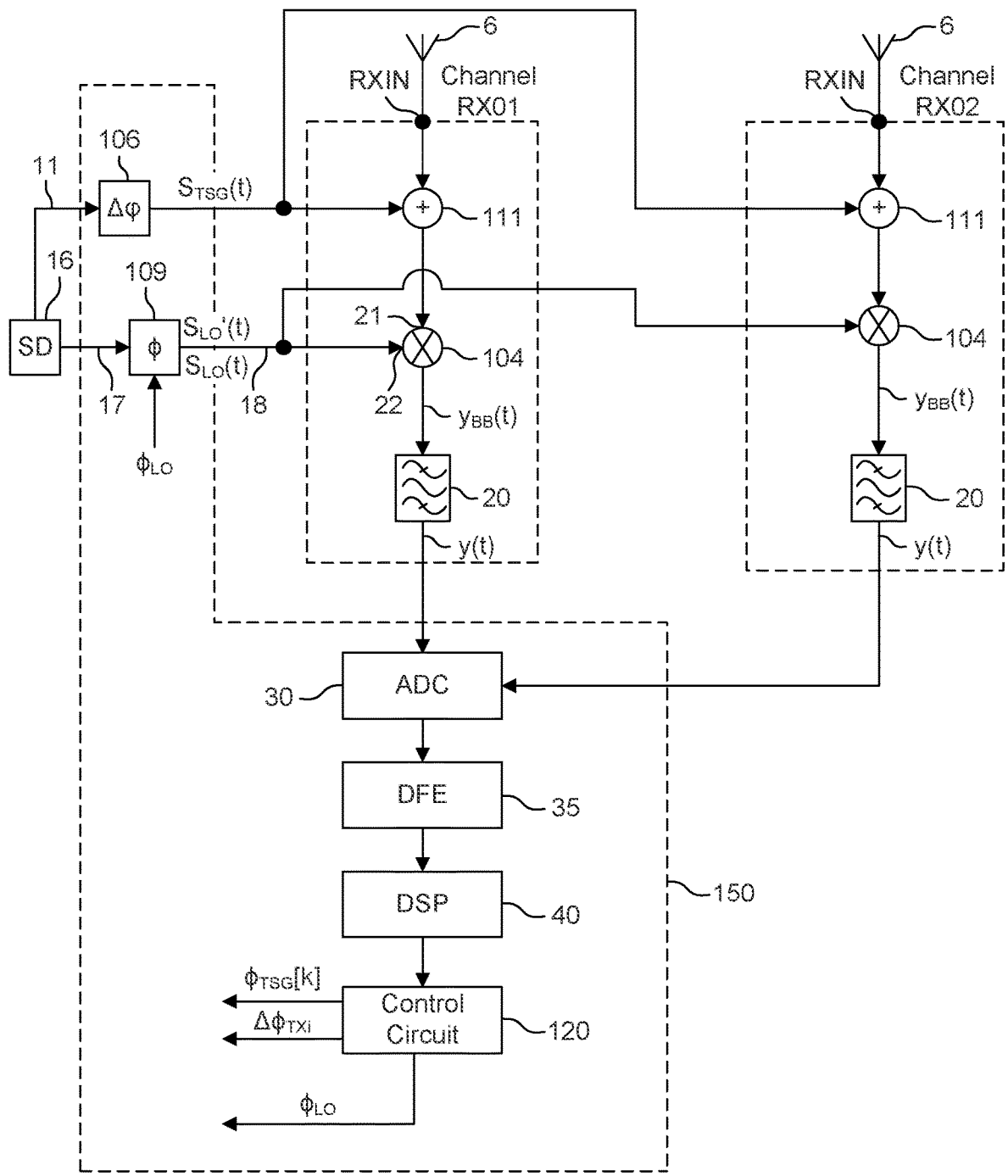
FIG. 7 is a block diagram illustrating another example of an MMIC according to one or more embodiments.

FIG. 6 is a block diagram illustrating one example of transmission circuitry of an MMIC 100 according to one or more embodiments. The MMIC 100 comprises monitoring circuitry 150 configured to monitor multiple RF channels, including transmission (TX) channels and reception (RX) channels, by way of testing and analysis. For example, the monitoring circuitry 150 may be configured to evaluate the phase and/or amplitude of each RF signal of each respective RF channel. In particular, FIG. 6 shows a portion of the monitoring circuitry 150 used to monitor the LO signal SLO(t) and the TX channels. In contrast, FIG. 7 shows a portion of the monitoring circuitry 150 used to monitor RX channels. Thus, FIGS. 6 and 7 are intended to be combined for the full monitoring of the LO signal SLO(t), the transmission signals, and the reception signals of the MMIC 100. As such, the portions of the monitoring circuitry 150 shown in FIGS. 6 and 7 are integrated into one circuit.

In this example, two TX channels TX01 and TX02 of a radar sensor are shown, each configured to generate respective RF output signals. The concept can be generalized to a system with an N number of TX channels, where N is any integer. Additionally, while RX channels are not shown in this embodiment, it will be understood that an M number of RX channels may also be included, as will be described in further detail below, where M is any integer.

In the present example, each channel TX01 and TX02 is configured to receive, at its input, an RF oscillator signal $S_{LO}(t)$, which may be provided from a local oscillator 101. The RF oscillator signal $S_{LO}(t)$ is configured as a continuous-wave signal. The LO signal $S_{LO}(t)$ is processed in the transmission signal path of one or more TX channels to generate a continuous-wave transmission signal that is radiated by the TX antenna 5.

Each channel TX01 and TX02 may include a phase shifter 105 for applying different phase settings to the channels. For example, each phase shifter 105 may manipulate the overall phase lags caused by channels. The RF output signals of the channels TX01 and TX02 are denoted as $s_{TX01}(t)$ and $s_{TX02}(t)$, respectively. In each channel TX01 and TX02 the signal path from the input to the output includes signal lines and one or more circuit components that may cause a phase lag. As a consequence, the output signals can be written as follows:

$$s_{TX01}(t) = A_{TX01} \cdot \cos(2\pi f_{LO} t + \varphi_{TX01} + \Delta\varphi_{TX01}) \quad (1)$$

$$s_{TX02}(t) = A_{TX02} \cdot \cos(2\pi f_{LO} t + \varphi_{TX02} + \Delta\varphi_{TX02}) \quad (2)$$

Thereby, the variables $A_{TX01}$, and $A_{TX02}$ denote the amplitudes of the RF output signals $s_{TX01}(t)$ and $s_{TX02}(t)$, and the frequency $f_{LO}$ is the frequency of the RF oscillator signal $s_{LO}(t)$. The phases $\varphi_{TX01}$ and $\varphi_{TX02}$ represent the phase lag caused by the channels TX01-TX03, respectively, without considering phase shifters 105, whereas $\Delta\varphi_{TX01}$, and $\Delta\varphi_{TX02}$ denote the additional the phase shifts caused by the phase shifters 105. As used herein, $\Delta\varphi_{TXi}$ is the phase shift caused by a phase shifter 105 on RF channel TXi and $\varphi_{TXi}$ is the phase shift caused by further circuit components in the signal path from the local oscillator 101 to the output of the RF channel TXi. $A_{TXi}$ denotes the amplitude of the output signal $s_{TXi}(t)$. All phases are referenced to the phase of the input RF oscillator signal $S_{LO}(t)$. This phase may be referred to a reference phase.

At this point it is noted that the phases as well as the amplitudes heavily depend on the operating conditions of the system. For example, depending on which of the TX channels is active, the temperature of the chip (e.g., the MMIC) will vary due to the power losses caused in the active channel(s). When two or more TX channels are active (i.e., outputting an RF signal) the temperature will be different as compared to the case, in which only one TX channel is active. Amplitudes and phases of the RF output signals $s_{TX01}(t)$ and $s_{TX02}(t)$ are temperature dependent.

For example, in beam forming applications (in which the results of amplitude and phase measurement are applied) channels TX01 and TX02 may be active (transmitting), which causes the temperature to rise to a specific value and thus particular amplitude and phase values. Amplitude and values shifts measured in a configuration, in which only one of the channels (TX01, TX02, or TXi) is active, would be different and thus incorrect (as the configuration which only one active channel does not resemble the beamforming application. Accordingly, it may be important to allow measurement of amplitude and phase values while both of the channels are active.

As mentioned, each channel TX01-TXN includes a phase shifter 105, which is configured to generate additional phase shift values $\Delta\varphi_{TX01}$, $\Delta\varphi_{TX02}$, and $\Delta\varphi_{TXi}$ (phase lags), which contribute to the phases of the RF output signals $s_{TX01}(t)$, $s_{TX02}(t)$, and $s_{TXi}(t)$. Furthermore, each channel TX01-TXi may include an RF amplifier 102 (e.g., a power amplifier (PA). In this case, the amplitudes $A_{TX01}$, $A_{TX02}$, and $A_{TXi}$ of the RF output signals $s_{TX01}(t)$, $s_{TX02}(t)$, and $s_{TXi}(t)$ depend on the gains of the RF amplifiers 102. In accordance with one specific example, the phase shifters 105 may be implemented using IQ modulators (In-Phase/Quadrature modulators, also referred to as Quadrature modulators). Digital-to-analog converters (not shown) may be used to convert digital values representing the phase shift values $\Delta\varphi_{TX01}$, $\Delta\varphi_{TX02}$, and $\Delta\varphi_{TXi}$ into analog signals that control (or adjust) the IQ modulators (phase shifters 105).

In some applications (e.g., for the system controller 50 or a radar sensor, see FIG. 3) it may be desirable to know the phases of the RF output signals of the different channels, e.g., relative to each other or relative to a reference phase (i.e., the phase of the input RF oscillator signal $S_{LO}(t)$). For example, the channels TX01-TXN may be transmission channels of a radar sensor device and the phases of the RF output signals will be tuned to specific values to realize the digital beamforming. As the absolute phase lags caused by the circuit components (e.g., the amplifiers 102) included in the channels TX01-TXN may be temperature dependent and may also be subject to production tolerances and aging, the respective phases $\varphi_{TX01}$, $\varphi_{TX02}$, and $\varphi_{TXi}$ need to be tuned or monitored, which may be accomplished by the phase shifters 105 included in the channels TX01-TXi.

In order to be able to monitor the phases $\varphi_{TX01}$ and $\varphi_{TX02}$ of the RF output signals $s_{TX01}(t)$ and $s_{TX02}(t)$, a monitoring circuitry 150 (including, e.g., phase shifter 106 and phase mixer 107) is provided that is used to sense the phases $\varphi_{TX01}$ and $\varphi_{TX02}$ and thus to detect a possible maladjustment of the phases. In the event that the measured phases $\varphi_{TX01}$ and $\varphi_{TX02}$ deviate from a desired setting, the phase shifters 105 may be used to compensate for the deviation by adding additional phase shifts $\Delta\varphi_{TX01}$ and $\Delta\varphi_{TX02}$.

Each transmission channel TX01-TXN may also include a transmission coupler 110 configured to couple out a portion of a respective output signal $s_{TX01}(t)$, $s_{TX02}(t)$, and $s_{TXi}(t)$ as a transmission monitoring signal. Thus, before output ports TX1out-TX3out, a portion of the continuous-wave transmission signal is coupled out by coupler 110 as a continuous-wave transmission monitoring signal $s_{TX01}'(t)$, $s_{TX02}'(t)$, $s_{TX03}'(t)$, ..., $s_{TXN}'(t)$).

The transmission monitoring signals are individually fed via passive monitoring signal paths to the RF port 15 of a phase mixer 107 (i.e., a down converting mixer) based on a switching matrix 108. The RF port 15 of the phase mixer 107 may be referred to as a monitoring port 15 configured to receive a monitoring signal Smon under monitoring/evaluation. For example, the transmission couplers 110 may be directional couplers (e.g., rat-race couplers, circulators, or the like) configured to direct a fraction of the power of the respective output signal $s_{TX01}(t)$, $s_{TX02}(t)$, and $s_{TXi}(t)$ to the inputs of a switching matrix 108. The switching matrix 108 (e.g., a multiplexer) is configured to receive the transmission monitoring signals from the transmission channels TX01-TXN, and selectively output one of the transmission monitoring signals to the phase mixer 107 for evaluation.

In addition, the monitoring circuitry 150 includes a passive LO monitoring signal path 12 that provides the RF oscillator signal $S_{LO}(t)$ to the switching matrix 108. Accordingly, the switching matrix 108 may also selectively output the RF oscillator signal $S_{LO}(t)$ to the phase mixer 107 as a monitoring signal for evaluation.

Accordingly, the switching matrix 108 receives transmission monitoring signals coupled out of the TX channels, receives the RF oscillator signal $S_{LO}(t)$ from the passive LO monitoring signal path 12, and outputs one of the received signals as a monitoring signal Smon at different measurement intervals. For example, during a first measurement interval, the RF oscillator signal $S_{LO}(t)$ may be selected by the switching matrix 108 as the monitoring signal Smon, during a second measurement interval, transmission monitoring signal $s_{TX01}'(t)$, may be selected by the switching matrix 108 as the monitoring signal Smon, during a third measurement interval, transmission monitoring signal $s_{TX02}'(t)$, may be selected by the switching matrix 108 as the monitoring signal Smon, and so on. Thus, each signal is individually provided by the switching matrix 108 on a one-by-one basis to the monitoring port of a phase detector (i.e., the RF port of the phase mixer 107) at different measurement intervals or sampling periods for testing.

As will be described in detail below, a phase detector of the monitoring system may comprise the phase shifter 106 and the phase mixer 107. The phase shifter 106 may be an IQ modulator, but is not limited thereto. The phase detector is used to monitor at least one RF channel of the MMIC, including TX channels and/or RF channels, in addition to monitoring the local oscillator (LO) signal $S_{LO}(t)$.

The phase detector comprises a test input port 13 that receives the RF LO signal $S_{LO}(t)$ from a test signal path 11 that comprises at least one active component (e.g., a signal distribution component 16). An active component as defined herein is a component that comprises at least one transistor. An active signal path is a signal path that comprises at least one active component. In contrast, a passive component is a component that does not comprises any transistors and a passive signal path is a signal path that does not comprise any active components. Thus, a passive signal path may comprise conducting lines called tracks or circuit traces, pads for connections, vias, and the like, as well as one or more passive components.

The test signal path 11 receives the LO signal $S_{LO}(t)$ from the LO 101 and provides the LO signal $S_{LO}(t)$ as a test signal to the test input port 13 during all measurement intervals. The test signal path 11 includes the signal distribution component 16 as an active component and the phase shifter 106, with the signal distribution component 16 being located upstream from the phase shifter 106. However, other or additional active components may be present on the test signal path 11 between the signal distribution component 16 and the phase shifter 106. The signal distribution component 16 also distributes the LO signal $S_{LO}(t)$ to a LO path 17 for use in RX channel monitoring, as will be further described in conjunction with FIG. 7

The phase mixer 107 is configured to receive a phase-shifted LO signal (e.g., RF oscillator signal $s_{TSG}(t)$ also referred to as test signal $s_{TSG}(t)$) from the phase shifter 106 at its reference port 14, and use the phase-shifted LO signal $s_{TSG}(t)$ to down-convert a monitoring signal Smon into baseband. Since all RF signals have the same frequency $f_{LO}$, the mixer output signal during TX channel monitoring will be a DC-signal $s_{DC}(t)$ that depends on the phases of $\varphi_{TX01}+\Delta\varphi_{TX01}$, $\varphi_{TX02}+\Delta\varphi_{TX02}$, etc. of the RF signals $s_{TX01}(t)$, $s_{TX02}(t)$, respectively. The phases are referenced to the phase of the RF oscillator signal $S_{LO}(t)$. In other words, the DC values of the DC-signal $s_{DC}(t)$ during TX channel monitoring represents the phase of the TX monitoring signal $s_{TXc}(t)$ relative to the phase of the test signal $s_{TSG}(t)$. During LO signal monitoring, the mixer output signal during will be a DC-signal $s_{DC}(t)$ that depends on the phase $\varphi_{SLO}$ of the LO signal $S_{LO}(t)$. In other words, the DC values of the DC-signal $s_{DC}(t)$ during LO signal monitoring represents the phase of the LO signal $S_{LO}(t)$ relative to the phase of the test signal $s_{TSG}(t)$. As will be described in detail below, reception signals of different reception channels may also be monitored and phase evaluated relative to the phase of the test signal $s_{TSG}(t)$.

In the present example, the phase mixer 107 receives a phase shifted version of the RF oscillator signal $s_{LO}(t)$ and the phase-shifted oscillator signal can thus be expressed as:

$$s_{TSG}(t)=A_{TSG}\cdot\cos(2\pi f_{LO}t+\varphi_{TSG}+\Delta\varphi_{TSG}) \quad (3)$$

where $A_{TSG}$ is the known signal amplitude and $\varphi_{TSG}$ the phase of the signal $s_{TSG}(t)$ received at the reference port 14 of the phase mixer 107. The phase $\Delta\varphi_{TSG}$ may be set by a phase shifter 106 coupled to the reference port 14 of the phase mixer 107 upstream thereto.

The phase mixer 107 receives at its reference port 14 the test signal $s_{TSG}(t)$, having the cumulative phase $\varphi_{TSG}+\Delta\varphi_{TSG}$, and receives at its monitoring port one of the transmission monitoring signals $s_{TX01}'(t)$, $s_{TX02}'(t)$, $s_{TXi}'(t)$ from one of the TX monitoring signal paths or the RF oscillator signal $S_{LO}(t)$ from the LO monitoring signal path. The test signal $s_{TSG}(t)$ is mixed down with the transmission monitoring signal or the RF oscillator signal $S_{LO}(t)$ that is selectively coupled from the switching matrix 108.

Since the phases of the test signal $S_{TSG}(t)$ and the monitoring signals (either the transmission monitoring signals or the RF oscillator signal $S_{LO}(t)$) are offset from each other, for example, by the phase shift introduced by the phase shifter 106, the mixer output signal $S_{DC}(t)$ will be a baseband signal having zero frequency (direct current or DC values). In addition, for each respective transmission channel TX01-TX03, the mixer output signal $S_{DC}(t)$ depends on the cosines of the phase-differences $\varphi_{TSG}-\varphi_{TX01}-\Delta\varphi_{TX01}+\Delta\varphi_{TSG}$, $\varphi_{TSG}-\varphi_{TX02}-\Delta\varphi_{TX02}+\Delta\varphi_{TSG}$, and $\varphi_{TSG}-\varphi_{SLO}$, and the amplitudes $A_{TX01}$, $A_{TX02}$, and $A_{SLO}$, respectively. By rotating $\Delta\varphi_{TSG}$ through a plurality of phase shift values or settings by the test phase shifter 106, a sinusoidal signal is obtained by sampling $S_{DC}(t)$ for each phase shift setting, where the sinusoidal signal represents the phase difference between the TSG input phase and the TX phase. Said differently, the mixer output signal SDC(t) is a baseband signal (i.e., a DC signal) that represents the phase of the monitoring signal received at the monitoring port relative to the phase of the test signal $S_{TSG}(t)$. If the phase of $S_{LO}(t)$ is considered to be the reference phase and set to 0, in this case the phase of $S_{DC}(t)$ equals $-\varphi_{TSG}$.

Accordingly, measurements may be made by acquiring discrete samples of the mixer output signal $S_{DC}(t)$ at sampling times t(k,0), t(k,1), and t(k,2). The index k denotes the measurement cycle (k=1, 2, 3, . . . ). The measured DC values (sampled values) of the mixer output signal $S_{DC}(t)$ may be used to calculate the sought phase info $\varphi_{TX01}$, $\varphi_{TX02}$, and $\varphi_{SLO}$. The phase of this sinusoidal signal $S_{DC}(t)$ corresponds to the phase difference (i.e., the phase offset $\Delta\varphi_i[k]$) between the monitoring signal Smon and the phase-shifted signal $s_{TSG}(t)$ used for the down-conversion). The measurement is repeated for all TX antennas, yielding NTx phase values, where NTx is the number of transmit antennas. Comparing these NTx phase values allows for TX phase calibration by the control circuit 120 by adjusting the phase shifters 105 in the individual RF TX paths properly. The measurement is also performed for the LO signal $S_{LO}(t)$.

The mixer output signal $S_{DC}(t)$ is output from the phase mixer 107 and is subsequently passed through a filter and an amplifier to a sensor ADC 31 and control circuit 120 for evaluation. The control circuit 120 may include a digital signal processor (DSP) or other type of processor that performs an FFT analysis for evaluating the phase and/or amplitude of the digitized mixer output signal. For example, the control circuit 120 may be representative of a controller or control unit which may include, for example, a programmable processor such as an (e.g., embedded) microcontroller or a similar device. The functions provided by the control circuit 120 may be (e.g., fully or partly) provided by the system controller 50 (see FIG. 2). Additionally, or alternatively, the functions provided by the control circuit 120 may be at least partly be provided by the DSP 40 (see FIG. 2). As such, the control circuit 120 represents a portion of the functions of the system controller 50 and/or the DSP 40.

The sensor ADC 31 converts the analog mixer output signal $S_{DC}(t)$ into a digital signal $S_{DC}(k)$ having DC sample values. In reference to a monitoring of a LO signal $S_{LO}(t)$, the analog DC signal may be sampled (e.g., by sensor ADC 31) using various different cumulative phases $\varphi_{TSG}+\Delta\varphi_{TSG}$ set by the phase shifter 106 by varying a phase shift $\Delta\varphi_{TSG}$ (i.e., Phaseshift_Test) applied to the LO signal $S_{LO}(t)$. In reference to a monitoring of a transmission signal, the analog DC signal may be sampled (e.g., by sensor ADC 31) at various different phase shift values $\Delta\varphi_{TSG}$ and $\Delta\varphi_{TXi}$ set by the phase shifters 106 and 105, respectively.

In other words, the sensor ADC 31 is configured to sample the mixer output signal $S_{DC}(t)$ in order to generate a sequence of sample values $S_{DC}(k)$. The sample values depend on the phase relationship (e.g., the phase difference between) of the signal in the transmission monitoring signal $s_{TXi}'(t)$ and the test signal $s_{TSG}(t)$ or on the phase relationship (e.g., the phase difference between) of the RF oscillator signal $S_{LO}(t)$ in the LO monitoring path and the test signal $s_{TSG}(t)$, depending on which signal is being evaluated.

During TX channel monitoring, only one TX channel is active at a time such that only one transmission monitoring signal is evaluated at a time, or none of the TX channels are active and only the LO monitoring path is used to allow the RF oscillator signal $S_{LO}(t)$ to be tested. The sequence of sample values $S_{DC}(k)$ is provided to the control circuit 120, which may comprise the DSP 40, and which is configured to apply a fast Fourier transform (FFT) to the sequence of sample values $S_{DC}(k)$ in order to obtain a spectrum of those sample values.

A DSP of the control circuit 120 (e.g., DSP 40 could be integrated therein), for example, may determine phase measurements, phase resolution, phase balance, and phase noise using the spectrum. The DSP of the control circuit 120 may determine a phase difference between a transmission monitoring signal $s_{TXi}'(t)$ and the test signal $s_{TSG}(t)$, between the RF oscillator signal $S_{LO}(t)$ and the test signal $s_{TSG}(t)$, or between an LO reference signal $S_{RXj}$ and the test signal $s_{TSG}(t)$ that is used as a reception (RX) monitoring signal. The phase differences may be represented as a difference, with the phase of $S_{LO}(t)$ being, for example, the reference. If "pha_LOin" represents the phase of the RF oscillator signal $S_{LO}(t)$, "pha_Test" represents the phase of the test signal $S_{TSG}(t)$, "pha_TXi" represents the phase of the selected transmission (TX) monitoring signal $s_{TXi}'(t)$, and "pha_RXj" represents the phase of the selected reception monitoring signal $S_{RXj}$, the phase differences can be represented as follows:

$$\text{pha\_Loin} - \text{pha\_Test}, \quad (4)$$

$$\text{pha\_TXi} - \text{pha\_Test}, \quad (5)$$

and $$\text{pha\_RXj} - \text{pha\_Test} \quad (6).$$

The control circuit 120 may process the phase differences to perform phase balancing between RF channels, for example, based on determined phase relationships or may transmit the phase differences or phase relationship information to a system controller 50, which in turn provides control information to the control circuit 120 for performing phase balancing between RF channels.

The control circuit 120 is configured to transmit compensated phase information to a phase shifter 105 of a transmission channel in order to control and adjust a phase shift $\Delta\Phi_{TXi}$ implemented by the phase shifter 105. The control circuit 120 may also be configured to control the phase shift $\Phi_{TSG}[k]$ of the phase shifter 106 based on compensated phase information. For example, the phase shift of the phase shifter 106 may be rotated through a sequence of phases (e.g., increased in constant, equidistant phase steps from zero degrees in steps of 36 degrees up to 360 degrees) such that mixer output signal $S_{DC}(t)$ is sinusoidal. As a result, digitized mixer output signal $s_{TSG}(k)$ is a discrete sinusoidal signal. The phase value $\varphi_{TSG}[k]$ determines the phases of the test signal $s_{TSG}(t)$ used for the down-conversion at the phase mixer 107. Thus, the sensor ADC 31 takes a set of samples from the output of the phase mixer 107 that together form a measured sequence of samples. As a result, the measured sequence is a set of DC values representative of a sinusoidal signal of one sample period taken over $2\pi$.

Furthermore, in response to a monitoring result of an RX channel, the control circuit 120 is configured to transmit compensated phase information to phase shifter 109 to adjust a phase offset $\Phi_{LO}$ (i.e., Phaseshift_LO) of the phase shifter 109 to optionally be used for a radar operation to compensate for variance. As noted above, the phase shifter 109 does not generate a phase-shifted LO signal $S_{LO}'(t)$ for conducting an RX channel monitoring operation, but instead passes LO signal $S_{LO}(t)$ therethrough during RX channel monitoring. Nevertheless, the control circuit 120 may be configured to control and adjust the phase shifts applied by phase shifters 105, 106, and 109 (i.e., Phaseshift_TX, Phaseshift_Test, and Phaseshift_LO, respectively) based on its monitoring of the different RF channels and the monitoring of the LO signal $S_{LO}(t)$ received at its LO input port LOin.

FIG. 7 is a block diagram illustrating another example of reception circuitry of the MMIC 100 according to one or more embodiments. The MMIC 100 comprises monitoring circuitry 150 configured to monitor multiple RF channels, including transmission (TX) channels and reception (RX) channels, by way of testing and analysis. For example, the monitoring circuitry 150 may be configured to evaluate the phase and/or amplitude of each RF signal of each respective RF channel.

In this example, two RX channels RX01 and RX02 of a radar sensor are shown, each configured to generate receive RF reception signals from respective antennas 6. The concept can be generalized to a system with M number of RX channels, where M is any integer.

During RX monitoring the test signal $S_{TSG}(t)$ is provided from the test phase shifter 106 as an RX monitoring signal that is injected into a selected reception channel (i.e., receive path) and evaluated. A similar procedure for RX monitoring is followed as described for TX monitoring, i.e., the test phase shifter 106 phase shifts the LO signal $S_{LO}(t)$ to different settings (e.g., 8 different phase settings) and provides the respective signals to the receive mixer 104 as the RX monitoring signal where it is mixed with the signal coming via the LO reference signal path 18. In particular, in the RX monitoring operation, the phase shifter 106 is enabled and is configured to generate the RX monitoring signal $S_{TSG}(t)$ using the LO signal $S_{LO}(t)$ and rotate through different phase settings, as was done for the TX monitoring. In particular, the phase shifter 106 applies a predetermined offset phase to the LO signal $S_{LO}(t)$ so that the RX monitoring signal $S_{Test}(t)$ is shifted in phase from the LO signal $S_{LO}(t)$ by the predetermined offset phase.

The monitoring circuit 150 performs specific measurements on the RX monitoring signal to detect faults or defective operation. In a radar receiver, the RX monitoring signal is an RF signal that is injected into an RF portion of the RX channel, upstream from the mixer 104. Specifically, the RX monitoring signal is the test signal $S_{TSG}(t)$ that is output from the phase shifter 106 and the RF part of the receive path is located between a reception input terminal RXIN connected to the antenna 6 and the mixer 104. The test signal $S_{TSG}(t)$ is distributed via an RX monitoring signal path to each of the RX channels as an RX monitoring signal to monitor the functionality of a selected RX channel.

An RX coupler 111 is used to inject the RX monitoring signal (i.e., the test signal $S_{TSG}(t)$) into the selected RX channel. However, in contrast to frequency-modulated radar signals that are transmitted and received during normal radar operation that comprise chirps (i.e., frequency ramps during which the frequency continuously changes), the RX monitoring signal during test mode or monitoring mode may have a constant frequency, which may be the same as the LO frequency of $S_{LO}(t)$.

The mixer 104 of each RX channel receives the RX monitoring signal (i.e., the test signal $S_{TSG}(t)$), as well as the LO reference signal $S_{RXj}(t)$, which is derived by passing the LO signal $S_{LO}(t)$ through LO phase shifter 109 and signal path 18 in this example. The LO phase shifter 109 receives the LO signal $S_{LO}(t)$ from the signal distribution component 16 via LO path 17 for use in the RX channel monitoring. Optionally, the LO phase shifter 109 may not be present. Specifically, the LO reference signal $S_{RXj}(t)$ is used as a reference signal that is transmitted along a reference signal path 18, through an active component (e.g., LO buffer 83), to each of the mixers 104. As such, the LO reference signal $S_{RXj}(t)$ is provided to the reference port 22 of a corresponding mixer 104 of the RX channel being monitored.

The RX monitoring signal is an RF continuous-wave signal derived from a phase-locked loop (PLL) of the radar MMIC (e.g., from the local oscillator 101) and has a constant frequency. The RF continuous-wave signal is the LO signal $S_{LO}(t)$ that gets phase shifted by phase shifter 106 (e.g., an IQ modulator (IQM)) with a pre-defined offset phase $\Delta\varphi_{TSG}$ before it is fed to the RX coupler 111. Thus, down conversion is performed by mixer 104 to generate a baseband signal $Y_{BB}(t)$ (i.e., a DC signal) having zero frequency and a DC value. The signal processing is done from the filtered output signal y(t) of the mixer 104 in digital domain after sampling with an ADC (e.g., ADC 30).

The mixer output signal $Y_{BB}(t)$ is further processed by a front end signal processing circuit, that includes an analog front end (AFE) circuit (e.g., analog signal processing chain 20), an ADC 30, and a digital front end (DFE) circuit 35 that are sequentially arranged along the receive path of the radar MMIC 100. The receive path of the radar MMIC 100 is an RX signal chain defined by the path between a reception input terminal RX IN and a digital data output terminal, with the mixer 104 and the front end signal processing circuit arranged along the receive path.

The front end signal processing circuit outputs an analog baseband signal Y(t) to the ADC 30. The ADC 30 is configured to sample the mixer output signal analog DC baseband signal Y(t) and provide a sequence of sampled values to the DFE circuit 35. The sequence of sampled values is taken over one period. The DFE circuit 35 receives the ADC sampled values and generates a digital signal Y(k), and, more specifically, a discrete sinusoidal signal comprising the ADC sampled values.

The front end signal processing circuit produces a digital signal Y(k) that is digital data (i.e., digital samples) representative of the test data received in the RX monitoring signal $S_{TSG}(t)$.

It is noted that during a radar operation, the digital signal Y(k) is a baseband signal representative of the radar data received in the RF signal yRF(t) and is further output from a digital data output terminal as a digital output signal.

For performing RX monitoring, the DSP 40 includes a discrete Fourier transform (DFT) module, engine, or any other module implementing frequency analysis of input data, and a DFT spectrum analyzer. The DFT spectrum analyzer may be a processor integrated as part of the DSP 40. Using the DFT spectrum analyzer, the DSP 40 has the capabilities of generating and analyzing a frequency spectrum of the digital signal Y(k) that includes the test data, as well as analyzing phase information (e.g., the phase difference at mixer 104 pha_RXj–pha_TSG (Equation 6), which includes contributions from elements 18, 109, 16, 81, 11, 106, 82 . . . ).

In some embodiments, the DSP 40 may apply a fast Fourier transform (FFT) to the digital signal Y(k) as one type of DFT to generate the frequency spectrum. The DFT spectrum analyzer, in turn, may be configured to analyze the FFT spectrum. Thus, it is contemplated that any type of DFT can be used and that the acronyms DFT and FFT can be used interchangeably. The frequency spectrum may further be referred to as an IF signal spectrum, DFT spectrum, or FFT spectrum. Thus, these terms may also be used interchangeably.

The DSP 40 is configured to, for example, provide the phase difference pha_RXj–pha_Test to the control circuit 120 or to a system controller 50, which in turn may adjust the phase offset $\Phi_{LO}$ (i.e., a reference phase setting) of the phase shifter 109 based on the phase difference pha_RXj–pha_Test.

The following describes the RX monitoring operation in more detail.

The mixer 104 is configured to receive the LO reference signal Six at its reference port 22 and a phase-shifted LO signal (e.g., test signal $S_{TSG}(t)$) as an RX monitoring signal from the phase shifter 106 at its RF port 21, and use LO reference signal $S_{RXj}(t)$ to down-convert the RX monitoring signal into a baseband signal $Y_{BB}(t)$. Since all RF signals have the same frequency $f_{LO}$, the mixer output signal $Y_{BB}(t)$ will be a DC-signal that depends on the phases of $\varphi_{TSG}$+$\Delta\varphi TSG$–$\varphi_{RX01}$, $\varphi_{RX02}$, etc. of the RF signals $S_{RX01}(t)$, $S_{RX02}(t)$, etc., respectively. The phases are referenced to the phase of the RF oscillator signal $S_{LO}(t)$. In other words, the DC values of the DC-signal $Y_{BB}(t)$ represents the phase of the RX monitoring signal $S_{TSG}(t)$ relative to the phase of the LO reference signal $S_{RXj}(t)$. It is noted that the phase of the LO reference signal $S_{RXj}(t)$ is different from the phase of the input LO signal $S_{LO}(t)$ due to the active components located along the signal path (e.g., SD 16 and LO buffer 83). Furthermore, even if the phase shift applied by phase shifter 106 is zero, the phase of the LO reference signal $S_{RXj}(t)$ would be different relative to the phase of the RX monitoring signal (i.e., test signal $s_{TSG}(t)$) due to the one or more active components located along the LO reference signal path 18 (e.g., LO buffer 83).

In the present example, the phase mixer 104 receives a phase shifted version of the RF oscillator signal $s_{LO}(t)$ as the RX monitoring signal $S_{TSG}(t)$ and the phase-shifted oscillator signal can thus be expressed as:

$$s_{TSG}(t)=A_{TSG}\cdot\cos(2\pi f_{LO}t+\varphi_{TSG}+\Delta\varphi_{TSG}), \quad (3)$$

where $A_{TSG}$ is the known signal amplitude and $\varphi_{TSG}$ the phase of the signal $S_{TSG}(t)$ received at the reference port 21 of the phase mixer 104. The phase $\Delta\varphi_{TSG}$ may be set by a phase shifter 106 coupled to the reference port 21 of the phase mixer 104 upstream thereto.

The phase mixer 104 receives at its RF port 21 the RX monitoring signal (test signal $s_{TSG}(t)$), having phase $\varphi_{TSG}$, and receives at its reference port 22 the LO reference signal $S_{RXj}(t)$ from the LO reference signal path 18. The RX monitoring signal (test signal $s_{TSG}(t)$) is mixed down with the LO reference signal $S_{RXj}(t)$.

Since the phases of the test signal $S_{TSG}(t)$ and the LO reference signal $S_{RXj}(t)$ are offset from each other, for example, by the phase shift introduced by the phase shifter 106, the mixer output signal $Y_{BB}(t)$ will be a baseband signal having zero frequency (direct current or DC values). In addition, for each respective reception channel RX01-RX04, the mixer output signal $Y_{BB}(t)$ depends on the cosines of the phase-differences $\varphi_{TSG}-\varphi_{SRXjO}$, and the amplitudes $A_{RX01}$, $A_{RX02}$, etc., respectively. By rotating $\Delta\varphi_{TSG}$ through a plurality of phase shift values or settings at the test phase shifter 106, a sinusoidal signal is obtained by sampling $Y_{BB}(t)$ for each phase shift setting, where the sinusoidal signal represents the phase difference between the TSG input phase and the LO reference signal $S_{RXj}(t)$ phase. Said differently, the mixer output signal $Y_{BB}(t)$ is a baseband signal (i.e., a DC signal) that represents the phase of the RX monitoring signal received at the monitoring port relative to the phase of the LO reference signal $S_{RXj}(t)$. Accordingly, measurements may be made by acquiring discrete samples of the mixer output signal $Y_{BB}(t)$ at sampling times t(k,0), t(k,1), and t(k,2). The index k denotes the measurement cycle (k=1, 2, 3, . . . ). The measured DC values (sampled values) of the mixer output signal $Y_{BB}(t)$ may be used to calculate the sought phase info $\varphi_{RX01}$, $\varphi_{RX02}$, etc. The measurement is repeated for all RX channels. Comparing these RX phase values allows for RX phase calibration by the DPS 40 and/or control circuit 120 by adjusting the phase shifters 109 (if present) in the individual RF RX paths properly.

The mixer output signal $Y_{BB}(t)$ is output from the phase mixer 104 and is subsequently passed through a filter and an amplifier to a sensor ADC 30 and DSP 40 for evaluation. The DSP 40 performs an FFT analysis for evaluating the phase and/or amplitude of the digitized mixer output signal.

The sensor ADC 30 converts the analog mixer output signal $Y_{BB}(t)$ into a digital signal Y(k) (see FIG. 4) having a DC sample value. In reference to an RX monitoring of an RX channel, the analog signal DC may be sampled (e.g., by sensor ADC 30) at various different phase shift values c° TSG $T_{SG}$ set by the phase shifter 106 by applying a phase shift $\Delta\varphi_{TSG}$ (i.e., Phaseshift_Test) to the LO signal $S_{LO}(t)$. In other words, the sensor ADC 30 is configured to sample the mixer output signal $Y_{BB}(t)$ in order to generate a sequence of sample values Y(k). The sample values depend on the phase relationship (e.g., the phase difference between) of the phase of the RX monitoring signal $s_{TSG}(t)$ and phase of the LO reference signal $S_{RXj}(t)$.

Here, only one RX channel is evaluated at a time. The sequence of sample values Y(k) is provided to the DSP 40 configured to apply a fast Fourier transform (FFT) to the sequence of sample values Y(k) in order to obtain a spectrum of those sample values.

The DSP 40, which may be integrated into the control circuit 120 may determine phase measurements, phase resolution, phase balance, and phase noise using the spectrum. The DSP 40 may determine a phase difference between an RX monitoring signal and the RF oscillator signal $S_{LO}(t)$. The phase differences may be represented as a difference, with the phase of $S_{RXj}(t)$ being, for example, the reference. The phase difference can be represented by Equation 6 above.

The control circuit 120 may process the phase differences to perform phase balancing between RF channels, for example, based on determined phase relationships or may transmit the phase differences or phase relationship information to a system controller 50, which in turn provides control information to the control circuit 120 for performing phase balancing between RF channels.

In response to a monitoring result of an RX channel, the control circuit 120 is configured to transmit compensated phase information to phase shifter 109 to adjust a phase offset $\Phi_{LO}$ (i.e., Phaseshift_LO) of the phase shifter 109 to optionally be used for a radar operation to compensate for variance. As noted above, the phase shifter 109 does not generate a phase-shifted LO signal $S_{LO}'(t)$ for conducting an RX channel monitoring operation, but instead passes LO signal $S_{LO}(t)$ therethrough during RX channel monitoring. Nevertheless, the control circuit 120 may be configured to control and adjust the phase shifts applied by phase shifters 105, 106, and 109 (i.e., Phaseshift_TX, Phaseshift_Test, and Phaseshift_LO, respectively) based on its monitoring of the different RF channels and the monitoring of the LO signal $S_{LO}(t)$ received at its LO input port LOin.

Figure 8:
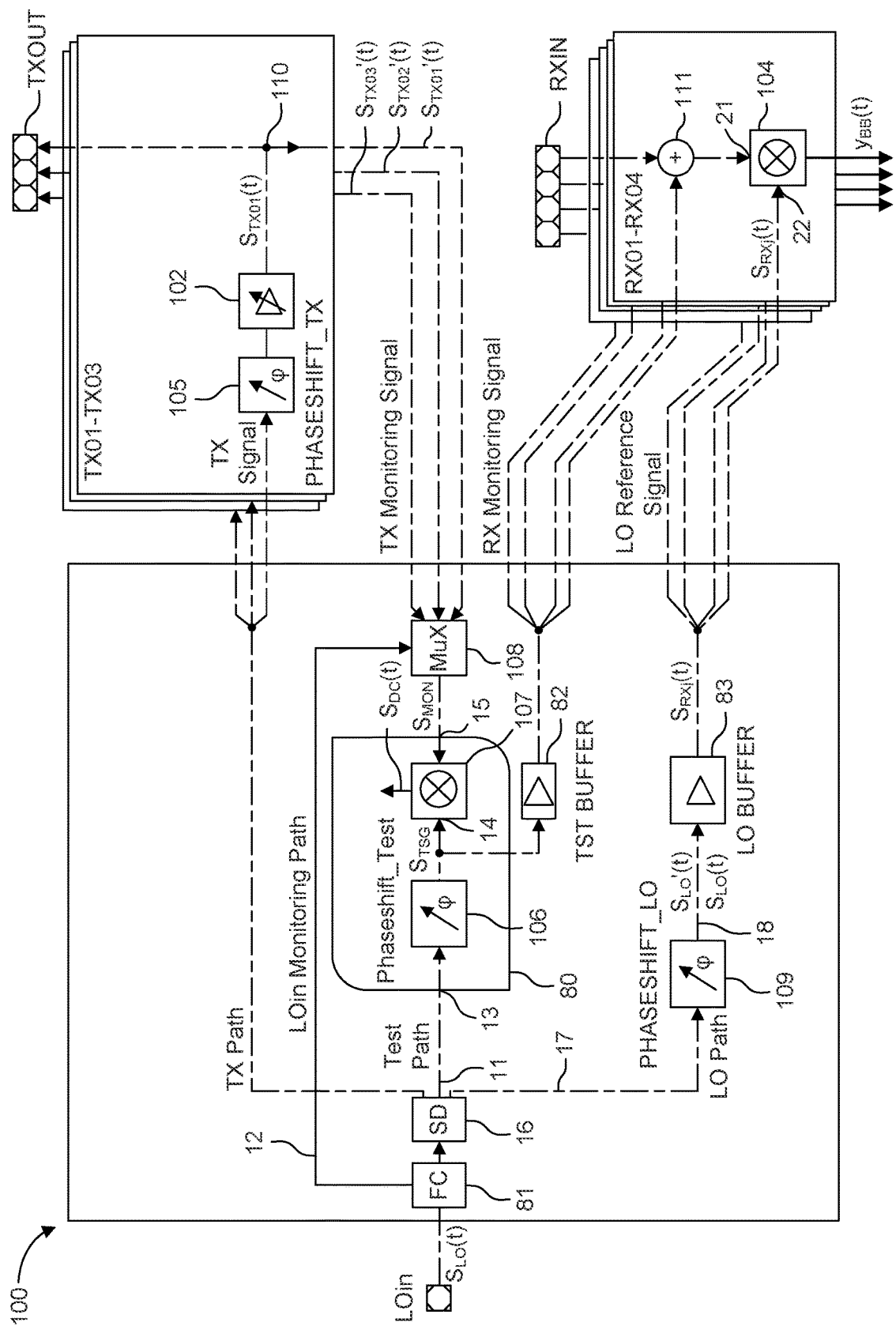
FIG. 8 is a schematic block diagram of a radar MMIC according to one or more embodiments.

FIG. 8 is a schematic block diagram of a radar MMIC 100 according to one or more embodiments. In particular, FIG. 8 shows combined circuitry of the TX signal monitoring and the LO signal monitoring circuitry shown in FIG. 6 and the RX monitoring circuitry shown in FIG. 7, where all monitoring functions are integrated into a single MMIC. It is noted that some circuitry, especially that of the monitoring circuitry 150, is not illustrated in FIG. 8 for the purpose of simplifying the drawing. However, it will be appreciated that those circuitry components can be found by referring back to FIGS. 6 and 7.

The radar MMIC 100 includes a number of TX channels TX01-TX03 and a number of RX channels RX01-RX04. Each of these RF channels is coupled to a respective port of MMIC 100 which is configured to be coupled to a respective TX or RX antenna. For example, TX channels TX01-TX03 are each coupled to a respective RF output port TXOUT which is further coupled to a TX antenna 5. Likewise, RX channels RX01-RX04 are each coupled to a respective RF input port RXIN which is further coupled to an RX antenna 6. The radar MMIC 100 further includes an LO input port LOin that is configured to receive the LO signal $S_{LO}(t)$ from an external source, such as from a LO oscillator 101 or from a master MMIC that is configured to distribute the LO signal $S_{LO}(t)$ to one or more slave MMICs. The LO input port LOin is configured to receive the LO signal $S_{LO}(t)$ from a source external to the MMIC 100 and provide the LO signal $S_{LO}(t)$ to a test signal path 11 and to a passive signal path 12.

Connected to the LO input port LOin is an optional frequency converter (FC) 81 that is configured to receive the LO signal $S_{LO}(t)$ and convert the frequency thereof via a frequency up-conversion or down-conversion. This allows MMICs in a MIMO system to receive a same LO signal $S_{LO}(t)$ but with the option to convert the frequency thereof internally to be used to generate radar signals with different frequency settings according to FIG. 2. Thus, if present, the frequency converter 81 receives the LO signal $S_{LO}(t)$ and converts a frequency of the LO signal $S_{LO}(t)$ into a different frequency to generate a frequency-converted LO signal.

MMIC 100 includes a phase detector 80 comprising a test input port 13 and a monitoring input port 15, wherein the phase detector 80 is configured to generate an output signal $S_{DC}(t)$ that represents a phase difference between a test signal (i.e., LO signal $S_{LO}(t)$, $S_{TSG}$) received at the test input port 13 and a monitoring signal Smon received at the monitoring input port 15.

The MMIC 100 includes a test signal path 11 comprising at least one active component 16, the test signal path 11 configured to receive the LO signal $S_{LO}(t)$ and provide the LO signal $S_{LO}(t)$ as a test signal to the test input port 13 during a first measurement interval. The MMIC 100 further includes a passive signal path 12 configured to receive the LO signal $S_{LO}(t)$ and provide the LO signal $S_{LO}(t)$ to the monitoring input port 15 as the monitoring signal Smon during the first measurement interval. As noted above, the passive signal path comprises no active components and the test signal path is an active signal path comprising the at least one active component 16, wherein each active component comprises at least one transistor.

If the frequency converter 81 is present, the test signal path 11 is configured to receive the frequency-converted LO signal and provide the frequency-converted LO signal as the test signal $S_{TSG}$ to a test input port 13 of a phase detector 80. Similarly, if the frequency converter 81, the passive signal path 12 is configured to receive the frequency-converted LO signal and provide the frequency-converted LO signal to the monitoring input port as the monitoring signal Smon during the first measurement interval.

It is important to note that the phase detector 80 is used to monitor the RF channels of the MMIC, including the TX channels and the RX channels, in addition to the LO signal $S_{LO}(t)$. For example, the phase-shifted test signal $S_{TSG}$ is used in all monitoring operations. By using the same phase detector 80 for all RF channel and LO channel monitoring operations, it is possible to determine and reconstruct the absolute phase relationship between each TX channel and the LO input port LOin and the absolute phase relationship between each RX channel and the LO input port LOin.

Under this example, the LO signal $S_{LO}(t)$ is evaluated during the first measurement interval in order to determine a phase difference (pha_LOin-pha_Test) between the LO signal $S_{LO}(t)$) transmitted through the test signal path 11 (i.e., the active signal path) and the passive signal path 12. The output signal $S_{DC}(t)$ from mixer 107 represents the phase difference (pha_LOin-pha_Test) during the first measurement interval.

TX channels and RX channels may also be evaluated individually during different measurement intervals to determine their respecting phase difference from the LO signal $S_{LO}(t)$) transmitted though the test signal path 11. The output signal $S_{DC}(t)$ from mixer 107 represents the phase difference (pha_TXi-pha_Test) for a selected TX channel evaluated during another measurement interval. The mixer output signal $Y_{BB}(t)$ generated by mixer 104 represents the phase difference (pha_RXj-pha_Test) for a selected RX channel evaluated during another measurement interval.

Once respective phase differences are obtains, phase relationships between each RF channel and the LO signal $S_{LO}(t)$ received at the LO input port LOin can be determined, and the phase shifts provided by phase shifters 105 and 109 may be adjusted by the control circuitry 120 based on evaluating the phase relationships for each RF channel.

The phase detector 80 comprises a test phase shifter 106 configured to receive the test signal (i.e., the LO signal $S_{LO}(t)$) and generate a phase-shifted test signal $S_{TSG}$ based on a phase offset $\Delta\Phi_{TSG}$ from a sequence of phase offsets $\Phi_{TSG}[k]$ applied to the received test signal (i.e., the LO signal $S_{LO}(t)$). The phase detector 80 further comprises a phase mixer 107 configured to mix the phase-shifted test signal $S_{TSG}$ and the monitoring signal Smon to generate the output signal $S_{DC}(t)$ comprising a plurality of direct current (DC) values. The output signal $S_{DC}(t)$ represents the phase difference (pha_LOin-pha_Test) during an evaluation of the LO signal $S_{LO}(t)$ and the phase difference (pha_TXi-pha_Test) for a selected TX channel evaluated during another measurement interval.

The MMIC 100 includes transmission channels TX01-TX03 each configured to output a continuous-wave transmit signals based on the LO signal $S_{LO}(t)$. For each transmission channel, the MMIC 100 also includes a respective transmit monitoring signal path (e.g., $ST_{X01}'$, $S_{TX02}'$, and $S_{TX03}'$ configured to couple out, via a respective transmission coupler 110, a portion of the continuous-wave transmit signal from the respective transmission channel as a transmit monitoring signal. Accordingly, the phase detector 80 is configured to receive the test signal $S_{LO}(t)$ at the test input port 13 during a second measurement interval and receive a transmit monitoring signal at the monitoring input port 15 as the monitoring signal Smon during the second measurement interval.

Each of the transmission channels TX01-TX03 includes a transmission phase shifter 105 provided on the transmission channel and configured to apply a transmission phase setting (Phaseshift_TX, $\Delta\Phi_{TXi}$) to the continuous-wave transmit signal of its respective transmission channel.

The MMIC 100 further includes a monitoring circuit 150 configured to receive the output signal $S_{DC}(t)$ during the first measurement interval as a first output signal, receive the output signal $S_{DC}(t)$ during the second measurement interval as a second output signal, and adjust the transmission phase setting (Phaseshift_TX, $\Delta\Phi_{TXi}$) of a respective transmission channel based on the first output signal and the second output signal. In particular, the monitoring circuit 150 (e.g., control circuit 120) is configured to subtract the first output signal representative of the phase difference (pha_LOin-pha_Test from the second output signal representative of the phase difference (pha_TXi-pha_Test) for a selected transmission channel, and generate a phase relationship signal that represents the phase relationship between the LO signal $S_{LO}(t)$ received at the LO input LOin and the selected transmission channel. This phase relationship indicated by the phase relationship signal can be calculated by the following equation:

$$\text{pha\_}TXi-\text{pha\_LOin}=\text{pha\_}TXi-\text{pha\_Test}-\text{pha\_Loin}+\text{pha\_Test} \quad (7).$$

The monitoring circuit 150 (e.g., control circuit 120) is configured to adjust the transmission phase setting (Phaseshift_TX, $\Delta\Phi_{TXi}$) of one or more transmission channels based on its phase relationship with the LO signal $S_{LO}(t)$ received at the LO input LOin according to the phase relationship signal.

The MMIC 100 includes reception channels RX01-RX04 each configured to receive a continuous-wave reception signal from a respective antenna 6 during a radar operation and to receive a receive monitoring signal that is derived from the test signal $S_{TSG}$ during a monitoring operation. Thus, the test signal $S_{TSG}$ generated by the phase shifter 106 of the phase detector 80 is used as the receive monitoring signal and is transmitted along an RX monitoring path to an input of coupler 111. Thus, phase shifter 106 is a test phase shifter configured to receive the LO signal $S_{LO}(t)$ and generate the receive monitoring signal as a phase-shifted test signal based on a phase offset from a sequence of phase offsets applied to the received test signal. Subsequently to being output from the phase shifter 106, the test signal $S_{TSG}$ is passed through a test TST buffer amplifier 82 that is used to transfer the test signal $S_{TSG}$ to a respective RX channel to be used as a receive monitoring signal.

As previously described above, each of the reception channels RX01-RX04 includes an RX coupler 111 and a mixer 104, with the RX coupler 111 being configured to couple a receive monitoring signal into an RF portion of its RX channel, upstream from the mixer 104. Thus, the receive monitoring signal can be provided to one of the input ports of the mixer 104 during a monitoring operation of the RX channel.

The MMIC 100 further includes a LO path 17 that feeds into a reference signal path 18. The LO path 17 receives the LO signal $S_{LO}(t)$ from the signal distribution component 16 (i.e., an active component) arranged at the test path 11. The reference signal path 18 is configured to receive the LO signal $S_{LO}(t)$ and provide the LO reference signal $S_{RXj}(t)$ to the other input port of the mixer 104. In particular, the LO phase shifter 109 is configured to shift the phase of the LO signal $S_{LO}(t)$ before it is supplied to a RX channel during a radar operation. That is to say, that the phase shifter 109 is connected between active component 16 and a respective reception channel. Thus, the LO phase shifter 109 is reference phase shifter provided on the reference signal path 18 and configured to apply a reference phase setting or phase offset $\Phi_{LO}$ to the LO signal $S_{LO}(t)$ to generate the reference signal $S_{LO}'(t)$ during a radar operation. However, during an RX monitoring operation, the LO phase shifter 109 does not phase shift the LO signal $S_{LO}(t)$. As a result, the LO signal $S_{LO}(t)$ passes through the LO phase shifter 109 such that LO reference signal $S_{RXj}(t)$ is provided to the reference port 22 of the mixer 104 without the phase setting $\Phi_{LO}$ being applied by the LO phase shifter 109. Nevertheless, a phase offset may exist in the LO reference signal $S_{RXj}(t)$ relative to the input LO signal $S_{LO}(t)$ due to active components. The LO signal $S_{LO}(t)$ is passed through an LO buffer amplifier 83 that is used to transfer the LO reference signal $S_{RXj}(t)$ to a respective RX channel to be used to mix down the receive monitoring signal into a base band signal $Y_{BB}(t)$.

The mixer 104 is configured to generate the mixer output signal $Y_{BB}(t)$ based on the RX monitoring signal and the LO reference signal $S_{RXj}(t)$, wherein, during the monitoring operation, the mixer output signal $Y_{BB}(t)$ represents a phase difference between the RX monitoring signal and the LO reference signal $S_{RXj}(t)$.

The monitoring circuit 150 (e.g., control circuit 120) is configured to receive the output signal $S_{DC}(t)$ from mixer 107 during the first measurement interval as a first output signal, receive the mixer output signal mixer output signal $Y_{BB}(t)$ from mixer 104 during a third measurement interval as a third output signal, and adjust the reference phase setting $\Phi_{LO}$ for the LO phase shifter 109 based on the first output signal and the third output signal.

In particular, the monitoring circuit (e.g., control circuit 120) is configured to subtract the first output signal $S_{DC}(t)$ from mixer 107 from the third output signal $Y_{BB}(t)$ from mixer 104 to generate a phase relationship signal that represents the phase relationship between the LO signal $S_{LO}(t)$ received at the LO input LOin and the selected reception channel. This phase relationship indicated by the phase relationship signal can be calculated by the following equation:

$$\text{pha}\_RXj/\text{pha}\_\text{LOin} = \text{pha}\_RXj/\text{pha}\_\text{Test} - \text{pha}\_\text{LOin}/\text{pha}\_\text{Test} \quad (8)$$

The monitoring circuit 150 (e.g., control circuit 120) is configured to adjust the reference phase setting $\Phi_{LO}$ of the phase shifter 109 of one or more reception channels based on its phase relationship with the LO signal $S_{LO}(t)$ received at the LO input LOin according to the phase relationship signal.

Figure 9:
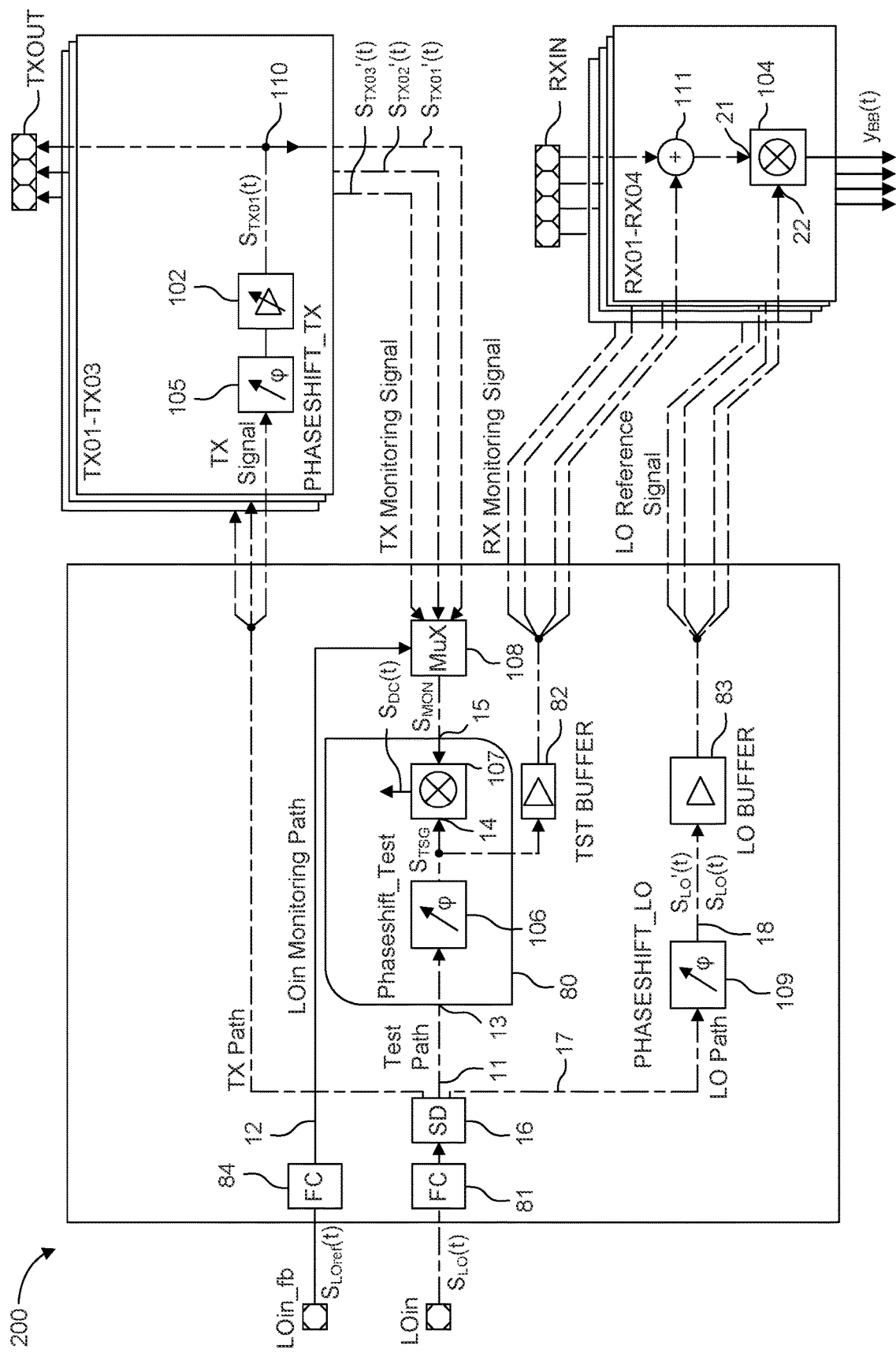
FIG. 9 is a schematic block diagram of a radar MMIC according to one or more embodiments.

FIG. 9 is a schematic block diagram of a radar MMIC 200 according to one or more embodiments. In particular, radar MMIC 200 is similar to that of radar MMIC 100 shown in FIG. 8, with the exception that the LOin monitoring path (i.e., the passive signal path 12) receives the reference LO signal $S_{LOref}(t)$ from a separate local oscillator port LOin fb. As similarly described in reference to MMIC 100 in FIG. 8, the passive signal path 12 provides the LO signal $S_{LOref}(t)$ to the switching matrix 108 to be used as a monitoring signal Smon during an evaluation of the LO signal $S_{LOref}(t)$. Thus, the phase of the TX and RX channels of the MMIC can be measured with respect to the reference phase of this separate reference LO signal $S_{LOref}(t)$. The LO input port LOin is configured to receive the LO signal $S_{LO}(t)$ from a source external to the radar MMIC 200 and provide the LO signal $S_{LO}(t)$ to the test signal path 11. The further local oscillator port LOin fb is configured to receive the LO signal $S_{LO}(t)$ from the source external to the radar MMIC 200 and provide the LO signal $S_{LO}(t)$ to the passive signal path 12. Separating the passive signal path 12 from the test path 11 provides an additional layer of functional safety and more flexibility in MIMO system implementation. Optionally, frequency converters (FC) 81 and 84 may be provided to convert the frequencies of the LO signals $S_{LO}(t)$ to frequencies different from the original input frequency.

Figure 10:
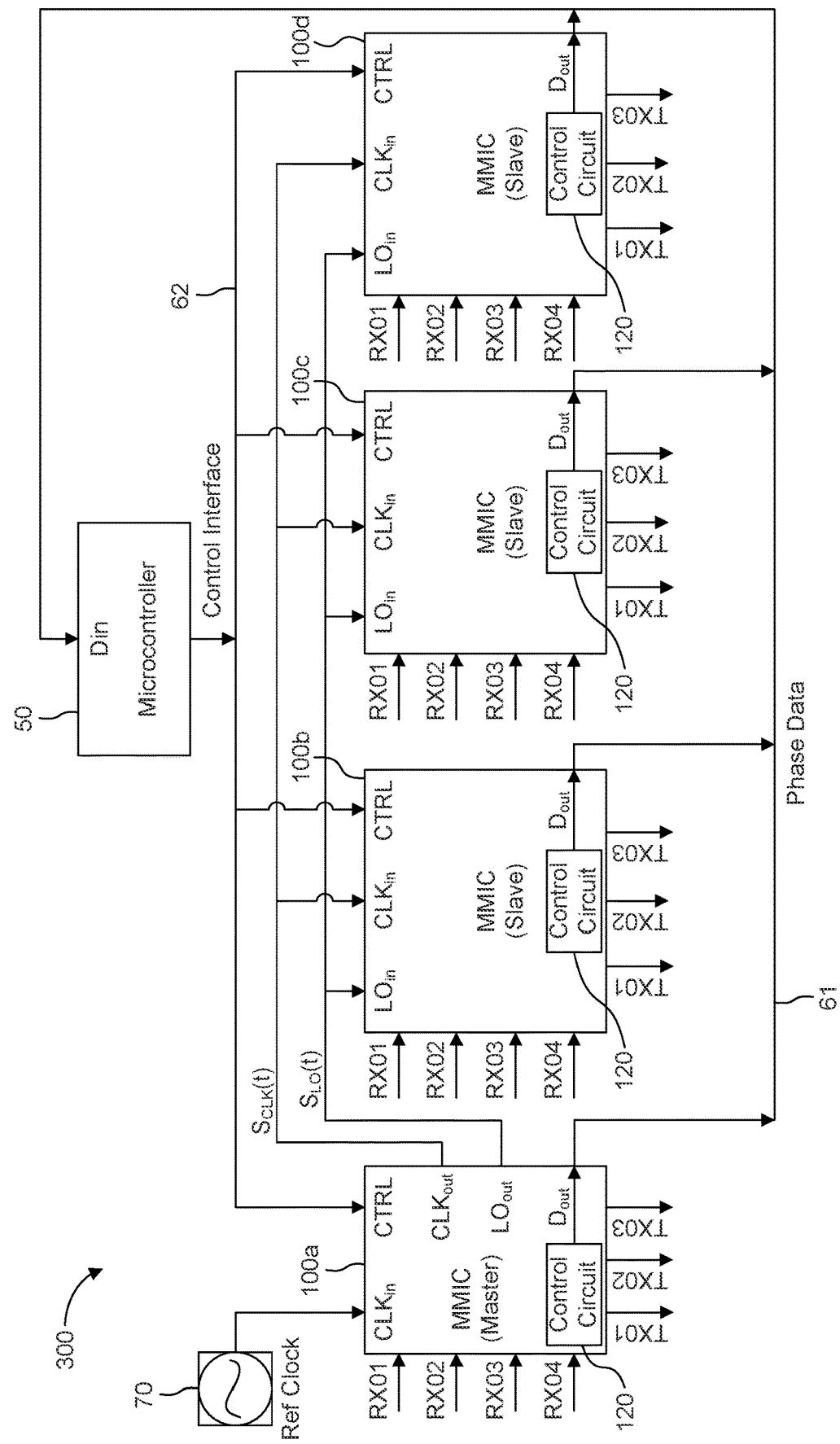
FIG. 10 is a block diagram for illustrating a radar system comprising a controller and a plurality of cascaded MMICs according to one or more embodiments.

FIG. 10 is a block diagram for illustrating a radar system 300 comprising a controller 50 and a plurality of cascaded MMICs 100a-100d according to one or more embodiments. In particular, radar system 300 is a MIMO radar system comprising a plurality of coupled (cascaded) 100a-100d that are further coupled to a system controller 50 (e.g., a microcontroller). While the system controller 50 is shown external to the MMICs 100a-100d, it is to be understood that the system controller 50 may be integrated within one of the MMICs 100a-100d while performing the same functions described herein. In this example, each of the MMICs 100a-100d have a similar structure as to MMIC 100 shown in FIG. 8. Alternately, they may have a similar structure as to MMIC 200 shown in FIG. 9.

Each MMIC 100a-100d can comprise a plurality of transmitting channels TX01, TX02, TX03, etc. and a plurality of receiving channels RX01, RX02, RX03, RX04, etc. Each of the transmitting channels may be coupled to a respective transmit antenna for transmitting radar signals and each of the receiving channels may be coupled to a respective receive antenna for receiving (reflected) radar signals. However, as noted above, it is also possible that an MMIC only includes a receiver with no transmitter or a transmitter with no receiver. Thus, in some cases, an MMIC may not include any transmitting channels or may not include any receiving channels.

Each of the MMICs 100a-100d may include a local oscillator (LO) that generates an RF oscillator signal $S_{LO}(t)$. However, for the operation of the radar system 300, it is beneficial for LO signals used by the MMICs to be coherent. Therefore, the LO signal is generated in one MMIC—the master MMIC 100a—and a representation of the LO signal is distributed to the slave MMICs 100b-100d. The representation may for example be identical to the LO signal or the representation may be a frequency-divided signal which is then reconstructed at each MMIC by frequency multiplication (e.g., via frequency converter 81 and/or 84).

While in the following, a distribution of the LO signal will be described, it is to be understood that the following may also be applied to a frequency-divided distribution of the LO signal. In the example illustrated, for this purpose, the LO signal SLO(t) is passed from an LO output LOout of the master MMIC 100a to the LO inputs LOin of the respective slave MMICs 100b-100d. In some embodiments, a unidirectional power splitter may first receive the LO signal SLO(t) from the master MMIC 100a, and distribute the split signal to the LO inputs LOin of the respective slave MMICs 100b-100d. In some embodiments, the master MMIC 100a could also use the LOout signal to feed itself using an additional LOin port to make sure the LO signal is equally delayed between the master and the slave MMICs.

The LO output LOout and the LO inputs LOin can be realized as a pin, a solder ball, or the like, depending on the chip package. In some example implementations, the LO output LOout and/or the LO inputs LOin can be realized by dedicated external contacts (e.g. pin, solder ball, etc.). In order to keep the number of external contacts of the MMICs small, the output of a transmitting channel (e.g. channel TX03) can also be reconfigured as LO output or LO input. However, a transmitting channel configured as LO output or LO input is then no longer available as an antenna port for connection to a (transmitting) antenna. In accordance with the example illustrated in FIG. 10, in the master MMIC 100a, the RF output of the transmitting channel TX03 can be configured as LO output, for which purpose it is useful to adapt the gain of the RF amplifier (cf. FIG. 4, amplifier 102). The resultant adaptation (reduction) of the signal power may be useful or expedient in order to minimize the crosstalk to the receiving channels RX01, RX02, etc. (cf. FIGS. 7 and 8) and in order to save energy. In the case of slave MMICs 100b-100d, the RF outputs of the respective transmitting channels TX03 are configured as LO inputs, which can be realized by means of couplers and/or switches.

In the example illustrated, the outputs designated by TX01, TX02, and TX03 can be connected to (transmitting) antennas and the inputs designated by RX01, RX02, RX03 and RX04 can be connected to (receiving) antennas. It should be pointed out at this juncture that all the MMICs can comprise local oscillators 101 (e.g. PLLs), but the latter are not used in the MMICs 100b-100d configured as slaves. For normal radar operation, the LO signal is generated centrally in the master MMIC and distributed among the slave MMICs. What is achieved in this way is that the LO signals processed in the MMICs are coherent.

In the example illustrated in FIG. 10, the master MMIC 100a generates the LO signal $S_{LO}(t)$ and distributes it via the LO output of the master MMIC 100a to the slave MMICs 100b-100d, as a result of which a plurality of MMICs can be connected in series (cascaded). A (system) clock signal SCLK(t) can likewise be generated by the master MMIC 100a and distributed to the slave MMICs 100b-100d. The master MMIC 100a may generate the clock signal SCLK(t) from a reference clock signal received from a separate reference clock generator 70, such as a quartz oscillator. For this purpose, the MMICs 100a-100d each have a separate clock output CLKout or clock input CLKin, which can be connected by means of strip lines. The clock signal SCLK(t) can have a clock frequency of a few MHz (e.g. 200 MHz), whereas the LO signal has an LO frequency fLO of a plurality of GHz (e.g. 76-81 GHz) or a corresponding divided value (e.g., 13 GHz or 39 GHz).

Alternatively, the clock signal SCLK(t) can also be generated by the reference clock generator 70. In this case, the clock signal SCLK(t) generated by the clock generator chip is fed to all the MMICs (master MMIC 100a and slave MMICs 100b-100d).

Each MMIC 1001-100d further includes a data output Dout for transmitting data corresponding to phase data generated by control circuitry 120 information (e.g., phase difference information or phase relationship information). The data from each MMIC 100a-100d may be transmitted as feedback information to the system controller 50 that receives the data at a data input Din.

For example, each MMIC 100a-100d may include at least one monitoring circuit 150 that measures the phase differences in accordance with the above description. The monitoring circuits 150 of the MMICs 100a-100d may transmit signals representing the phase differences or the calculated phase relationships to the system controller 50. In turn, the system controller 50 can evaluation the phase relationships and transmit control information to respective control circuitry 120 of each MMIC 100a-100d in order to control and possibly adjust the phase settings of its phase shifters 105 and 109.

Thus, each MMIC 100a-100d may transmit phase data 60 corresponding to signal phase shift of a corresponding radar signal channel. A phase shift of a radar signal channel relative to radar signals in other channels and/or other MMIC may increase with an increasing temperature difference between the radar signal channels or based on a phase drift of the LO signal SLO(t) received at a MMIC relative to the other MMICs. This phenomenon may be referred to as phase drift and can occur when different channels or different MMICs operate at different temperatures or receive an LO signal SLO(t) that has a different phase at its respective LO input port LOin relative to the other MMICs. Thus, phase shifts between radar signal channels can be correlated with phase differences to the input LO signal SLO(t). Phase drift may significantly impact the performance of an MMIC or the cascaded system and should be detected and prevented.

The system controller 50 is configured receive the phase data from the MMICs 100a-100d via a data bus 61 and generate control signals (e.g., phase offset control signals) that control the phase settings of the phase shifters 105 and 109 at each MMIC 100a-100d. The control signals are received at a control input CTRL of the MMICs 100a-100d via a control signal bus 62, where they are received by the MMIC's respective control circuit 120. Each control circuit 120 handles the adjustment of the phase settings of the phase shifters 105 and 109 to avoid phase drift between respective TX and RX channels both at the individual chip level and the system level across all MMIC 100a-100d, including transmitting channels and/or receiving channels, based on the received control signals.

In view of the above, any combination of monitoring the phase relationship between an RF channel and the received LO signal SLO(t) at a particular MMIC within radar system 300 is possible. The phase relationships for all RF channels may be determined and used by the system controller 50 to reduce phase drift between RF channels within the radar system 300. As noted above, some MMICs may not include a receiver module or may not include a transmitting module, while others may have both.

The MMIC architecture of each radar chip is able to measure the phase relationship of the TX and RX channels with respect to the phase of the LO input LOin. The passive signal path is the key to compensate the delay and drift of all the active stage required to boost the input LO signal to drive TX/RX channels. The measurement of the phase difference of the LO signal routed through the passive signal path 12 and the test signal path 11 is key to enable calibration and/or monitoring capabilities of the TX/RX channels within a single MMIC and throughout multiple MMICs of a MIMO system. Phase difference measurements at a single MMIC (e.g., for the LO signal, a TX channel, and an RX channel) is performed sequentially according to different measurement intervals. However, in each measurement interval, phase difference measurements can be executed in parallel among all MMICs.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized, and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A radio frequency (RF) system, comprising:
    a radar monolithic microwave integrated circuit (MMIC), comprising:
        a phase detector comprising a test input port, and a monitoring input port, wherein the phase detector is configured to generate an output signal that represents a phase difference between a test signal received at the test input port and a monitoring signal received at the monitoring input port;
        a test signal path comprising at least one active component, the test signal path configured to receive a local oscillator signal and provide the local oscillator signal as the test signal to the test input port during a first measurement interval; and
        a passive signal path configured to receive the local oscillator signal and provide the local oscillator signal to the monitoring input port as the monitoring signal during the first measurement interval.

2. The RF system of claim 1, wherein the phase detector is used to monitor at least one RF channel of the MMIC in addition to the local oscillator signal to determine a signal indicating a reference phase.

3. The RF system of claim 1, wherein the passive signal path comprises no active components and the test signal path is an active signal path comprising the at least one active component, wherein each active component comprises at least one transistor.

4. The RF system of claim 3, wherein the radar MMIC further comprises:
    a local oscillator port configured to receive the local oscillator signal from a source external to the radar MMIC and provide the local oscillator signal to the test signal path and to the passive signal path.

5. The RF system of claim 3, wherein the radar MMIC further comprises:
    a local oscillator port configured to receive the local oscillator signal from a source external to the radar MMIC and provide the local oscillator signal to the test signal path; and
    a further local oscillator port configured to receive the local oscillator signal from the source external to the radar MMIC and provide the local oscillator signal to the passive signal path.

6. The RF system of claim 1, wherein the phase detector comprises:

a test phase shifter configured to receive the test signal and generate a phase-shifted test signal based on a phase offset from a sequence of phase offsets applied to the test signal; and a phase mixer configured to mix the phase-shifted test signal and the monitoring signal to generate the output signal comprising a plurality of direct current (DC) values.

7. The RF system of claim 1, wherein the radar MMIC further comprises:

a first transmission channel configured to output a first continuous-wave transmit signal based on the local oscillator signal; and a first transmit monitoring signal path configured to couple out a portion of the first continuous-wave transmit signal from the first transmission channel as a first transmit monitoring signal, wherein the phase detector is configured to receive the test signal at the test input port during a second measurement interval and receive the first transmit monitoring signal at the monitoring input port as the monitoring signal during the second measurement interval.

8. The RF system of claim 7, wherein the radar MMIC further comprises:

a first transmission phase shifter provided on the first transmission channel and configured to apply a transmission phase setting to the first continuous-wave transmit signal; and a monitoring circuit configured to receive the output signal during the first measurement interval as a first output signal, receive the output signal during the second measurement interval as a second output signal, and adjust the transmission phase setting based on the first output signal and the second output signal.

9. The RF system of claim 8, wherein the monitoring circuit is configured to subtract the first output signal from the second output signal to generate a phase relationship signal, and the monitoring circuit is configured to adjust the transmission phase setting based on the phase relationship signal.

10. The RF system of claim 1, wherein the radar MMIC further comprises:

a first receive channel comprising a mixer, wherein the first receive channel is configured to receive a reception signal from an antenna during a radar operation and to receive a receive monitoring signal from the phase detector during a monitoring operation, wherein the receive monitoring signal is derived from the test signal; and a reference signal path configured to receive a reference signal derived from the local oscillator signal and provide the reference signal to the mixer, wherein the mixer is configured to generate a mixer output signal based on the receive monitoring signal and the reference signal, wherein the mixer output signal represents a phase difference between the receive monitoring signal and the reference signal.

11. The RF system of claim 10, wherein the reference signal is the local oscillator signal.

12. The RF system of claim 10, wherein the phase detector comprises:

a test phase shifter configured to receive the test signal and generate the receive monitoring signal as a phase-shifted test signal based on a phase offset from a sequence of phase offsets applied to the test signal.

13. The RF system of claim 10, wherein the radar MMIC further comprises:

a first reference phase shifter provided on the reference signal path and configured to apply a reference phase setting to the local oscillator signal to generate a phase-shifted reference signal used during the radar operation; and a monitoring circuit configured to receive the output signal during the first measurement interval as a first output signal, receive the mixer output signal during a second measurement interval as a second output signal, and adjust the reference phase setting for the radar operation based on the first output signal and the second output signal.

14. The RF system of claim 13, wherein the monitoring circuit is configured to subtract the first output signal from the second output signal to generate a phase relationship signal, and the monitoring circuit is configured to adjust the reference phase setting based on the phase relationship signal.

15. The RF system of claim 1, further comprising:

a frequency converter configured to receive the local oscillator signal and convert a frequency of the local oscillator signal into a different frequency to generate a frequency-converted local oscillator signal.

16. The RF system of claim 15, wherein:

the test signal path is configured to receive the frequency-converted local oscillator signal and provide the frequency-converted local oscillator signal as the test signal to the test input port, and the passive signal path is configured to receive the frequency-converted local oscillator signal and provide the frequency-converted local oscillator signal to the monitoring input port as the monitoring signal during the first measurement interval.

17. A radio frequency (RF) system, comprising:

a plurality of radar monolithic microwave integrated circuits (MMICs), each radar MMIC comprising:

a phase detector comprising a test input port, a monitoring input port, and an output port, where in the phase detector is configured to generate an output signal at the output port that represents a phase difference between a test signal received at the test input port and a monitoring signal received at the monitoring input port;

a test signal path comprising at least one active component, the test signal path configured to receive a local oscillator signal and provide the local oscillator signal as the test signal to the test input port during a first measurement interval; and a passive signal path configured to receive the local oscillator signal and provide the local oscillator signal to the monitoring input port as the monitoring signal during the first measurement interval; and a controller configured to adjust a phase of at least one RF channel of the plurality of radar MMICs based on each output signal generated by each of the plurality of radar MMICs.

18. The RF system of claim 17, further comprising:

a master radar MMIC configured to generate the local oscillator signal and distribute the local oscillator signal to the plurality of radar MMICs.

19. The RF system of claim 17, wherein the phase detector is used to monitor at least one RF channel of the radar MMIC in addition to the local oscillator signal.

20. The RF system of claim 17, wherein the passive signal path comprises no active components and the test signal path is an active signal path comprising the at least one active component, wherein each active component comprises at least one transistor.

\* \* \* \* \*